(12) United States Patent
Agrawal et al.

(10) Patent No.: US 11,682,206 B2
(45) Date of Patent: *Jun. 20, 2023

(54) METHODS AND APPARATUS FOR PROJECTING AUGMENTED REALITY ENHANCEMENTS TO REAL OBJECTS IN RESPONSE TO USER GESTURES DETECTED IN A REAL ENVIRONMENT

(71) Applicant: Intel Corporation, Santa Clara, CA (US)

(72) Inventors: Ankur Agrawal, Portland, OR (US); Glen J. Anderson, Beaverton, OR (US); Benjamin Bair, Hillsboro, OR (US); Rebecca Chierichetti, Brookings, OR (US); Pete Denman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/323,765

(22) Filed: May 18, 2021

(65) Prior Publication Data

US 2021/0271883 A1 Sep. 2, 2021

Related U.S. Application Data

(63) Continuation of application No. 16/455,112, filed on Jun. 27, 2019, now Pat. No. 11,030,459.

(51) Int. Cl.
*G06K 9/00* (2022.01)
*G06F 3/0484* (2022.01)
(Continued)

(52) U.S. Cl.
CPC .............. *G06V 20/20* (2022.01); *G06F 3/017* (2013.01); *G06F 3/04842* (2013.01); *G06T 19/006* (2013.01)

(58) Field of Classification Search
CPC .................................................... G06T 19/006
(Continued)

(56) References Cited

U.S. PATENT DOCUMENTS 8,400,548 B2 3/2013 Bilbrey et al.
8,405,680 B1 3/2013 Cardoso Lopes et al.
(Continued)

FOREIGN PATENT DOCUMENTS

WO 2013033842 3/2013
WO 2014147686 9/2014

OTHER PUBLICATIONS

European Patent Office, "Communication pursuant to Article 94(3) EPC," issued in connection with European Patent Application No. 20 164 274.1, dated Apr. 28, 2022, 4 pages.
(Continued)

*Primary Examiner* — Javid A Amini
(74) *Attorney, Agent, or Firm* — Hanley, Flight & Zimmerman, LLC

(57) ABSTRACT

Methods and apparatus for projecting augmented reality (AR) enhancements to real objects in response to user gestures detected in a real environment are disclosed. An example apparatus includes one or more processors to execute computer-readable instructions to identify a user gesture within a real environment based on data obtained from a motion sensor. The user gesture is associated with a target real object from among one or more real objects located within the real environment. The user gesture represents a desired shape of a desired virtual drawing to be projected to the target real object. The one or more processors are further to execute the instructions to determine an AR enhancement based on the user gesture and the target real object. The AR enhancement includes a virtual drawing having a shape corresponding to the desired shape of the
(Continued)

desired virtual drawing. The one or more processors are further to execute the instructions to instruct a projector to project the AR enhancement to the target real object.

20 Claims, 11 Drawing Sheets

(51) Int. Cl.
  *G06T 19/00* (2011.01)
  *G06F 3/01* (2006.01)
  *G06V 20/20* (2022.01)
  *G06F 3/04842* (2022.01)

(58) Field of Classification Search
  USPC .......................................................... 345/633
  See application file for complete search history.

(56) References Cited

U.S. PATENT DOCUMENTS

| | | | |
|---|---|---|---|
| 8,873,147 B1 | 10/2014 | Rhodes et al. | |
| 9,330,478 B2 | 5/2016 | Anderson | |
| 9,405,680 B2 | 8/2016 | Fineberg et al. | |
| 9,430,035 B2 | 8/2016 | Anderson et al. | |
| 9,563,955 B1* | 2/2017 | Kamarshi | G01B 11/026 |
| 11,030,459 B2* | 6/2021 | Agrawal | G06V 40/20 |
| 2007/0219792 A1 | 9/2007 | Normandin | |
| 2008/0150899 A1 | 6/2008 | Lin | |
| 2011/0138285 A1 | 6/2011 | Kuo et al. | |
| 2012/0113092 A1* | 5/2012 | Bar-Zeev | G06F 3/012 |
| | | | 345/419 |
| 2012/0113223 A1 | 5/2012 | Hilliges et al. | |
| 2013/0021374 A1 | 1/2013 | Miao et al. | |
| 2013/0050642 A1* | 2/2013 | Lewis | A61B 3/113 |
| | | | 351/204 |
| 2013/0346168 A1 | 12/2013 | Zhou et al. | |
| 2014/0055361 A1* | 2/2014 | Anderson | G06F 3/005 |
| | | | 345/156 |
| 2014/0071041 A1 | 3/2014 | Fujimaki | |
| 2014/0104274 A1* | 4/2014 | Hilliges | G06F 30/20 |
| | | | 345/424 |
| 2014/0184496 A1* | 7/2014 | Gribetz | G06F 3/013 |
| | | | 345/156 |
| 2014/0306866 A1* | 10/2014 | Miller | G06F 3/017 |
| | | | 345/8 |
| 2015/0059002 A1 | 2/2015 | Balram et al. | |
| 2016/0034254 A1 | 2/2016 | LeBeau et al. | |
| 2016/0091964 A1 | 3/2016 | Iyer et al. | |
| 2016/0180590 A1 | 6/2016 | Kamhi et al. | |
| 2016/0189426 A1 | 6/2016 | Thomas et al. | |
| 2016/0378204 A1 | 12/2016 | Chen et al. | |
| 2017/0115742 A1 | 4/2017 | Xing et al. | |
| 2017/0314930 A1 | 11/2017 | Monterroza et al. | |
| 2017/0364154 A1 | 12/2017 | Levesque et al. | |
| 2018/0284882 A1 | 10/2018 | Shipes et al. | |
| 2018/0322701 A1 | 11/2018 | Pahud et al. | |
| 2019/0043260 A1* | 2/2019 | Anderson | G06V 40/20 |
| 2019/0043267 A1* | 2/2019 | Anderson | G06F 3/011 |
| 2019/0272674 A1 | 9/2019 | Comer et al. | |
| 2020/0051335 A1 | 2/2020 | Antypov | |
| 2020/0117336 A1 | 4/2020 | Mani et al. | |
| 2020/0257245 A1 | 8/2020 | Linville et al. | |
| 2020/0265641 A1 | 8/2020 | Cashman et al. | |

OTHER PUBLICATIONS

Wikipedia, "Line Rider," dated Apr. 10, 2019, retrieved from [https://en.wikipedia.org/wiki/Line_Rider], 5 pages.

European Patent Office, "Extended European Search Report," issued in connection with European Patent Application No. 20164274.1, dated Sep. 24, 2020, 7 pages.

United States Patent and Trademark Office, "Non-Final Office Action," issued in connection with U.S. Appl. No. 16/455,112, dated Aug. 10, 2020, 10 pages.

United States Patent and Trademark Office, "Final Office Action," issued in connection with U.S. Appl. No. 16/455,112, dated Nov. 19, 2020, 14 pages.

United States Patent and Trademark Office, "Notice of Allowance," issued in connection with U.S. Appl. No. 16/455,112, dated Feb. 21, 2021, 8 pages.

* cited by examiner

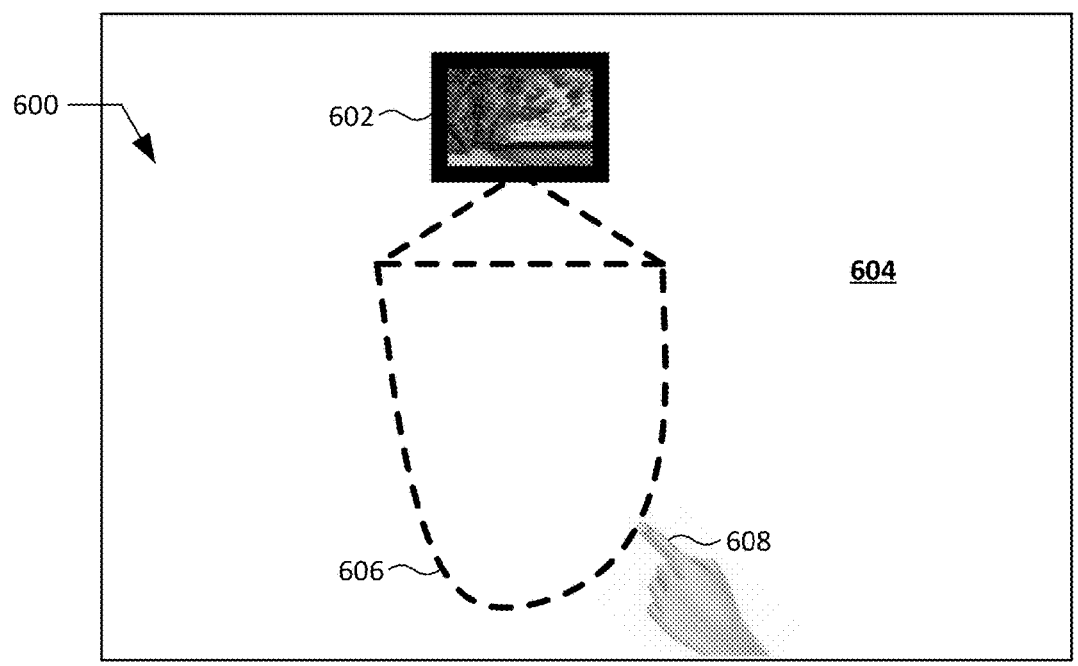
FIG. 6A
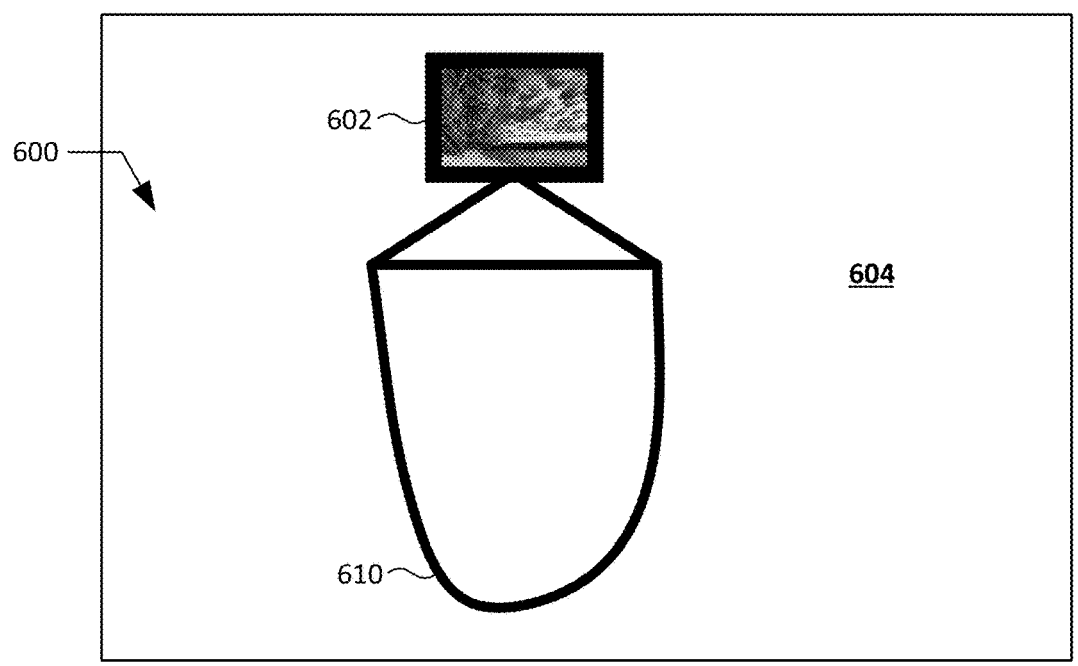
FIG. 6B

METHODS AND APPARATUS FOR PROJECTING AUGMENTED REALITY ENHANCEMENTS TO REAL OBJECTS IN RESPONSE TO USER GESTURES DETECTED IN A REAL ENVIRONMENT

RELATED APPLICATIONS

This application arises from a continuation of U.S. patent application Ser. No. 16/455,112, filed Jun. 27, 2019, entitled "Methods and Apparatus for Projecting Augmented Reality Enhancements to Real Objects in Response to User Gestures Detected in a Real Environment." The entirety of U.S. patent application Ser. No. 16/455,112 is hereby incorporated herein by reference.

FIELD OF THE DISCLOSURE

This disclosure relates generally to augmented reality and, more specifically, to methods and apparatus for projecting augmented reality enhancements to real objects in response to user gestures detected in a real environment.

BACKGROUND

Augmented reality (AR) techniques can be implemented to alter an individual's perception of a real environment by enhancing one or more real object(s) located within the real environment with computer-generated perceptual information. In some known AR techniques, visual perceptual information is displayed on (e.g., projected onto) at least one real object located within the real environment. The displayed perceptual information can be constructive to (e.g., additive to) or destructive of (e.g., masking of) one or more physical features and/or properties of the real object and/or the real environment. AR techniques are typically performed in real-time, and are often based on semantic contexts associated with the real content (e.g., real structures, real objects, real individuals, etc.) of the real environment.

BRIEF DESCRIPTION OF THE DRAWINGS

FIGS. 6A, 6B, 6C and 6D illustrate a fourth example of the AR enhancement apparatus 200 of FIG. 2 projecting an AR enhancement to a real object located within a real environment in response to an occurrence of a user gesture detected in the real environment.

Figure 1:
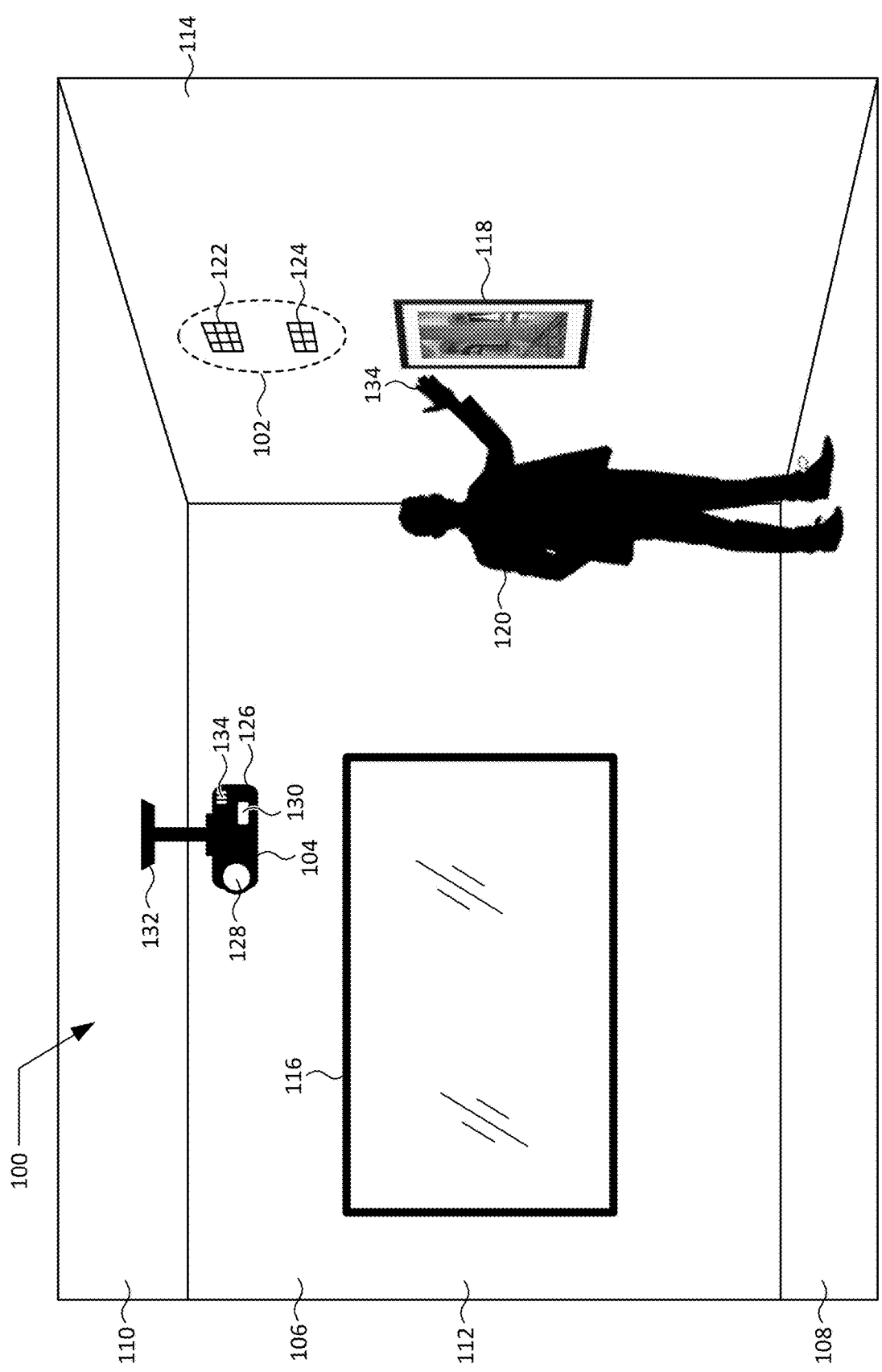
FIG. 1 illustrates an example real environment in which an example sensor array and an example projector may be implemented in accordance with teachings of this disclosure to project one or more AR enhancement(s) to one or more real object(s) located within the real environment in response to one or more user gesture(s) detected in the real environment.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

AR is an emerging area with a growing need for content creation, particularly with regard to improving the intersection (e.g., blending or integration) between the physical space (e.g., a real environment) and the virtual space (e.g., computer-generated perceptual information) of existing AR techniques. Unlike existing AR techniques, example methods and apparatus disclosed herein advantageously improve the intersection between the physical space and the virtual space by projecting AR enhancements (e.g., AR extensions and/or object-intersecting AR content) to real objects located within a real environment in response to user gestures detected in the real environment.

As used herein, the term "real environment" means a tangible and/or physical environment including and/or defined by one or more boundary surface(s) and/or boundary structure(s) (e.g., a ground surface, a floor, a ceiling, a wall, etc.). As used herein, the term "real object" means a tangible and/or physical object (e.g., a whiteboard, a framed picture, a human, etc.). In examples disclosed herein, one or more real object(s) may be located and/or positioned within a real environment (e.g., located and/or positioned on one more boundary surface(s) of the real environment, and/or located and/or positioned within the spatial boundaries of the real environment defined by the boundary surfaces). As used herein, the term "user gesture" means a tangible and/or physical human movement (e.g., movement of a hand, arm, foot or leg of a human). In examples disclosed herein, one or more user gesture(s) may occur within a real environment (e.g., within the spatial boundaries of the real environment defined by the boundary surfaces).

Examples disclosed herein generate a map of a real environment based on depth data obtained from a sensor array. Based on the map, examples disclosed herein detect one or more real object(s) located within the real environment. Examples disclosed herein detect an occurrence of a user gesture (e.g., a hand, arm, foot or leg gesture made by a human) within the real environment based on motion data obtained from the sensor array. Based on the user gesture and further based on the map and/or the real object(s), examples disclosed herein determine a target real object (e.g., one of the detected real object(s)) associated with the user gesture. Examples disclosed herein determine an AR enhancement (e.g., an AR extension and/or object-intersecting AR content) based on the user gesture and/or the target real object. In some disclosed examples, the AR enhancement is determined based on an evaluation of contextual information associated with the user gesture and/or the target real object. In some disclosed examples, the AR enhancement is determined based on a simulation of physics associated with the user gesture and/or the target real object. Examples disclosed herein instruct a projector located in the real environment to project the AR enhancement to the target real object. Thus, examples disclosed herein advantageously project an AR enhancement to a real object located within a real environment in response to a user gesture detected in the real environment.

FIG. 1 illustrates an example real environment 100 in which an example sensor array 102 and an example projector 104 may be implemented in accordance with teachings of this disclosure to project one or more AR enhancement(s) to one or more real object(s) located within the real environment 100 in response to one or more user gesture(s) detected in the real environment 100. The real environment 100 of FIG. 1 can be of any size, shape, orientation, configuration, structure, and/or type, and can include any number of sensor arrays (including the sensor array 102 of FIG. 1) and/or projectors (including the projector 104 of FIG. 1) respectively located, positioned, oriented and/or configured in any manner within the real environment 100. In the illustrated example of FIG. 1, the real environment 100 is implemented as an example room 106 including and/or defined in part by an example floor 108, an example ceiling 110, a first example wall 112, and a second example wall 114. The floor 108, the ceiling 110, the first wall 112 and the second wall 114 of FIG. 1 are boundary surfaces of the room 106 and/or, more generally, of the real environment 100 of FIG. 1.

In the illustrated example of FIG. 1, a number of real objects are located and/or positioned within (e.g., located and/or positioned on the boundary surfaces of) the room 106 and/or, more generally, within the real environment 100. For example, as shown in FIG. 1, the room 106 and/or the real environment 100 include(s) a first example real object 116 (e.g., a whiteboard) located and/or positioned (e.g., mounted) on the first wall 112, a second real object 118 (e.g. a framed picture) located and/or positioned (e.g., mounted) on the second wall 114, and a third real object 120 (e.g., a human and/or user) located and/or positioned (e.g., standing on) the floor 108. The room 106 and/or, more generally, the real environment 100 of FIG. 1 can include any number and/or type of real objects respectively and/or collectively located and/or positioned in any location(s), position(s), orientation(s), and/or configuration(s).

The example sensor array 102 of FIG. 1 includes one or more example depth sensor(s) 122 and one or more example motion sensor(s) 124. The sensor array 102 of FIG. 1 may include any number, type and/or combination of depth sensors and/or motion sensors located and/or positioned in any arrangement, orientation and/or configuration within the real environment 100 of FIG. 1. In the illustrated example of FIG. 1, the depth sensor(s) 122 and the motion sensor(s) 124 are respectively located and/or positioned on the second wall 114 of the room 106 within the real environment 100. In other examples, one or more of the depth sensor(s) 122 and/or one or more of the motion sensor(s) 124 of FIG. 1 may alternatively be located and/or positioned on the floor 108, the ceiling 110, and/or the first wall 112 of the room 106 within the real environment 100. In still other examples, one or more of the depth sensor(s) 122 and/or one or more of the motion sensor(s) 124 of FIG. 1 may alternatively be located and/or positioned within and/or on the projector 104 of FIG. 1. In still other examples, one or more of the depth sensor(s) 122 and/or one or more of the motion sensor(s) 124 of FIG. 1 may alternatively be located and/or positioned within and/or on a real object (e.g., the first real object 116, the second real object 118, etc.) located and/or positioned within the real environment 100.

The depth sensor(s) 122 of FIG. 1 sense(s), measure(s) and/or detect(s) depth data (e.g., depths, distances, ranges, etc.) associated with the real environment 100 of FIG. 1. For example, the depth sensor(s) 122 can sense, measure and/or detect depth data associated with the projector 104, the room 106, the floor 108, the ceiling 110, the first wall 112, the second wall 114, the first real object 116, the second real object 118, and/or the third real object 120 located within the field(s) of view of the depth sensor(s) 122 relative to the position(s) of the depth sensor(s) 122. The depth sensor(s) 122 of FIG. 1 can be implemented by any number (e.g., 1, 2, 3, etc.) of depth cameras, radio detection and ranging (RADAR) sensors, light detection and ranging (LIDAR) sensors, infrared sensors, time-of-flight (TOF) sensors, acoustic sensors, tactile sensors, conductance sensors, etc.

The motion sensor(s) 124 of FIG. 1 sense(s), measure(s) and/or detect(s) motion data (e.g., movements, changes in position, changes in orientation, etc.) associated with the real environment 100 of FIG. 1. For example, the motion sensor(s) 124 can sense, measure and/or detect motion data associated with the real objects (e.g., the first real object 116, the second real object 118, and/or the third real object 120) located within the field(s) of view of the motion sensor(s) 124 relative to the position(s) of the motion sensor(s) 124. The motion sensor(s) 124 of FIG. 1 can be implemented by any number (e.g., 1, 2, 3, etc.) of depth cameras, RADAR sensors, LIDAR sensors, infrared sensors, TOF sensors, acoustic sensors, tactile sensors, conductance sensors, accelerometers, gyroscopes, compasses, etc.

In the illustrated example of FIG. 1, the projector 104 is located and/or positioned within (e.g., located and/or positioned on the boundary surfaces of) the room 106 and/or, more generally, within the real environment 100. For example, as shown in FIG. 1, the projector 104 is located and/or positioned (e.g., mounted) on the ceiling 110 of the room 106 within the real environment 100. In other examples, the projector 104 of FIG. 1 may alternatively be located and/or positioned on the floor 108, the first wall 112, and/or the second wall 114 of the room 106 within the real environment 100. In still other examples, the projector 104 of FIG. 1 may alternatively be located and/or positioned on a real object (e.g., a table, a stand, etc.) located and/or positioned within the real environment 100.

The example projector 104 of FIG. 1 includes an example housing 126, an example projection source 128, an example projection controller 130, and an example mounting bracket 132. In the illustrated example of FIG. 1, the housing 126 of the projector 104 carries and/or houses the projection source 128 and the projection controller 130 of the projector 104, and the mounting bracket 132 couples the projector 104 to a structure and/or surface (e.g., to the ceiling 110 of the room 106) of the real environment 100. In some examples, the housing 126 of the projector 104 is movable relative to the mounting bracket 132 of the projector 104 such that the projection source 128 carried and/or housed by the housing 126 can be moved (e.g., rotated, tilted, panned and/or oriented) to project content (e.g., one or more AR enhancement(s)) toward a specified boundary surface (e.g., toward the floor 108, the ceiling 110, the first wall 112, and/or the second wall 114 of FIG. 1) of the real environment 100, and/or toward a specified real object (e.g., toward the first real object 116, the second real object 118, and/or the third real object 120 of FIG. 1) located and/or positioned within the real environment 100. In other examples, the projection source 128 of the projector 104 is movable relative to the housing 126 of the projector 104 such that the projection source 128 can be moved (e.g., rotated, tilted, panned, zoomed and/or oriented) within the housing 126 to project content (e.g., one or more AR enhancement(s)) toward a specified boundary surface (e.g., toward the floor 108, the ceiling 110, the first wall 112, and/or the second wall 114 of FIG. 1) of the real environment 100, and/or toward a specified real object (e.g., toward the first real object 116, the second real object 118, and/or the third real object 120 of FIG. 1) located and/or positioned within the real environment 100.

In the illustrated example of FIG. 1, the projector 104 projects and/or displays one or more AR enhancement(s) (e.g., one or more AR extension(s) and/or object-intersecting AR content) to one or more real object(s) (e.g., the first real object 116, the second real object 118, and/or the third real object 120 of FIG. 1) located and/or positioned within the real environment 100 of FIG. 1. In some examples, the projector 104 of FIG. 1 may be implemented as a digital projector capable of projecting and/or displaying digital content (e.g., digital images and/or digital videos including textual and/or graphical information). The projector 104 of FIG. 1 projects and/or displays one or more AR enhancement(s) via the example projection source 128 of FIG. 1. The projection source 128 may be implemented as a projection lens operatively coupled to and/or operatively aligned with a projection lamp. The projection controller 130 of FIG. 1 controls the position and/or orientation of the projection source 128 and/or, more generally, the projector 104 of FIG. 1. For example, the projection controller 130 may adjust, move and/or otherwise change the position and/or orientation of the projection source 128 from a current position and/or orientation to a target position and/or orientation to facilitate the projection of an AR enhancement to the first real object 116 or the second real object 118 located within the real environment 100 of FIG. 1.

The sensor array 102 and the projector 104 of FIG. 1 are respectively operatively coupled to (e.g., in wired or wireless electrical communication with) one or more example processing device(s) 134 (e.g., microprocessor(s), microcontroller(s), etc.) that, along with the sensor array 102 and the projector 104 of FIG. 1, form and/or provide an AR enhancement apparatus that controls and/or manages the development and the generation of the AR enhancements to be projected by the projector 104. In some examples, the processing device(s) 134 of the AR enhancement apparatus may be located within the real environment 100 of FIG. 1. For example, one or more of the processing device(s) 134 of the AR enhancement apparatus may be integrated within and/or carried by the projector 104 of FIG. 1, and/or may be integrated within and/or carried by some other real object (e.g., a real object other than the projector 104) located within the real environment 100. In other examples, one or more of the processing device(s) 134 may be located remotely (e.g., via a cloud-based architecture) from the real environment 100 of FIG. 1.

As further described below in connection with the example of FIG. 2, the processing device(s) 134 of the AR enhancement apparatus generate(s) a map of the real environment 100 of FIG. 1 based on depth data obtained from the depth sensor(s) 122 of the sensor array 102 of FIG. 1. Based on the map, the processing device(s) 134 of the AR enhancement apparatus detect(s) one or more real object(s) (e.g., the first real object 116, the second real object 118, and/or the third real object 120 of FIG. 1) located within the real environment 100 of FIG. 1. The processing device(s) 134 of the AR enhancement apparatus also detect(s) an occurrence of a user gesture (e.g., a gesture made by an example hand 134 of the human corresponding to the third real object 120 of FIG. 1) within the real environment 100 of FIG. 1 based on motion data generated by and obtained from the motion sensor(s) 124 of the sensor array 102 of FIG. 1. Based on the user gesture and further based on the map and/or the real object(s), the processing device(s) 134 of the AR enhancement apparatus determine(s) a target real object (e.g., one of the detected real object(s)) associated with the user gesture. The processing device(s) 134 of the AR enhancement apparatus determine(s) an AR enhancement (e.g., an AR extension and/or object-intersecting AR content) based on the user gesture and/or the target real object. In some examples, the processing device(s) 134 of the AR enhancement apparatus determine the AR enhancement based on an evaluation of contextual information associated with the user gesture and/or the target real object. In some examples, the processing device(s) 134 of the AR enhancement apparatus determine(s) the AR enhancement based on a simulation of physics associated with the user gesture and/or the target real object. The processing device(s) 134 of the AR enhancement apparatus command(s) the projector 104 of FIG. 1 to project the AR enhancement to the target real object. Thus, the AR enhancement apparatus advantageously projects an AR enhancement to a real object located within the real environment 100 of FIG. 1 in response to a user gesture detected in the real environment 100.

Figure 2:
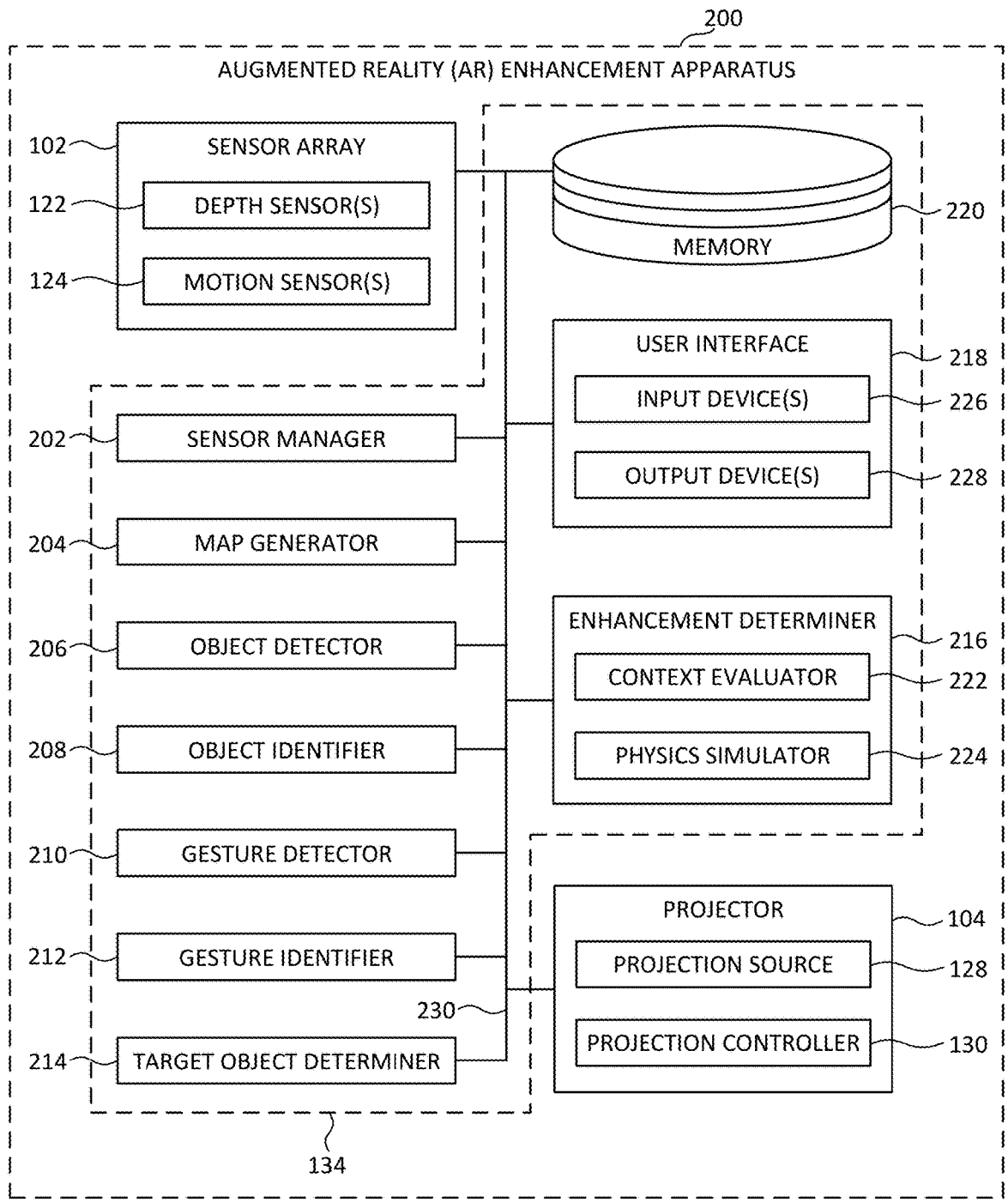
FIG. 2 is a block diagram of an example AR enhancement apparatus constructed in accordance with teachings of this disclosure.

FIG. 2 is a block diagram of an example AR enhancement apparatus 200 constructed in accordance with teachings of this disclosure. In the illustrated example of FIG. 2, the AR enhancement apparatus 200 includes the example sensor array 102 (including the example depth sensor(s) 122 and the example motion sensor(s) 124) and the example projector 104 (including the example projection source 128 and the example projection controller 130) of FIG. 1 described above, and further includes an example sensor manager 202, an example map generator 204, an example object detector 206, an example object identifier 208, an example gesture detector 210, an example gesture identifier 212, an example target object determiner 214, an example enhancement determiner 216, an example user interface 218, and an example memory 220. The example enhancement determiner 216 of FIG. 2 includes an example context evaluator 222 and an example physics simulator 224. The example user interface 218 of FIG. 2 includes one or more example input device(s) 226 and one or more example output device(s) 228. However, other example implementations of the AR enhancement apparatus 200 of FIG. 2 may include fewer or additional structures.

In the illustrated example of FIG. 2, the sensor array 102 (including the depth sensor(s) 122 and the motion sensor(s) 124), the projector 104 (including the projection source 128 and the projection controller 130), the sensor manager 202, the map generator 204, the object detector 206, the object identifier 208, the gesture detector 210, the gesture identifier 212, the target object determiner 214, the enhancement determiner 216 (including the context evaluator 222 and the physics simulator 224), the example user interface 218 (including the input device(s) 226 and the output device(s) 228), and/or the memory 220 are operatively coupled (e.g., in electrical communication) via an example communication bus 230. The sensor manager 202, the map generator 204, the object detector 206, the object identifier 208, the gesture detector 210, the gesture identifier 212, the target object determiner 214, the enhancement determiner 216, the context evaluator 222, and/or the physics simulator 224 of FIG. 2 may individually and/or collectively be implemented by any type(s) and/or any number(s) of semiconductor device(s) (e.g., microprocessor(s), microcontroller(s), etc.).

In some examples, the sensor array 102 (including the depth sensor(s) 122 and the motion sensor(s) 124) may be integrated within, carried by, and/or mounted on the projector 104 of the AR enhancement apparatus 200 of FIG. 2. In other examples, the sensor array 102 (including the depth sensor(s) 122 and the motion sensor(s) 124) may be located remotely from the projector 104. For example, the sensor array 102 (including the depth sensor(s) 122 and the motion sensor(s) 124) and may be located and/or positioned (e.g., mounted) on a boundary surface of a real environment (e.g., on the second wall 114 of the real environment 100 of FIG. 1).

In some examples, the sensor manager 202, the map generator 204, the object detector 206, the object identifier 208, the gesture detector 210, the gesture identifier 212, the target object determiner 214, the enhancement determiner 216 (including the context evaluator 222 and the physics simulator 224), the example user interface 218 (including the input device(s) 226 and the output device(s) 228), and/or the memory 220 of FIG. 2 may be integrated within, carried by, and/or mounted on the projector 104 of the AR enhancement apparatus 200 of FIG. 2. In other examples, the sensor manager 202, the map generator 204, the object detector 206, the object identifier 208, the gesture detector 210, the gesture identifier 212, the target object determiner 214, the enhancement determiner 216 (including the context evaluator 222 and the physics simulator 224), the example user interface 218 (including the input device(s) 226 and the output device(s) 228), and/or the memory 220 may be located remotely (e.g., via a cloud-based architecture) from the sensor array 102 and/or the projector 104. For example, the sensor manager 202, the map generator 204, the object detector 206, the object identifier 208, the gesture detector 210, the gesture identifier 212, the target object determiner 214, the enhancement determiner 216 (including the context evaluator 222 and the physics simulator 224), the user interface 218 (including the input device(s) 226 and the output device(s) 228), and/or the memory 220 may be located remotely from a real environment (e.g., the real environment 100 of FIG. 1) in which the sensor array 102 and/or the projector 104 is/are located.

The depth sensor(s) 122 of FIGS. 1 and 2 sense(s), measure(s) and/or detect(s) depth data (e.g., depths, distances, ranges, etc.) associated with a real environment (e.g., the real environment 100 of FIG. 1). For example, the depth sensor(s) 122 can sense, measure and/or detect depth data associated with one or more boundary surface(s) (e.g., a ground surface, a floor, a ceiling, a wall, etc.) of the real environment, and/or one or more real object(s) (e.g., a whiteboard, a framed picture, a human, etc.) located within the real environment. The depth sensor(s) 122 of FIGS. 1 and 2 can be implemented by any number (e.g., 1, 2, 3, etc.) of depth cameras, RADAR sensors, LIDAR sensors, infrared sensors, TOF sensors, acoustic sensors, tactile sensors, conductance sensors, etc. Depth data sensed, measured and/or detected by the depth sensor(s) 122 may be associated with one or more local time(s) (e.g., time stamped) at which the data was collected by the depth sensor(s) 122. Depth data sensed, measured and/or detected by the depth sensor(s) 122 may be of any quantity, type, form and/or format, and may be stored in a computer-readable storage medium such as the example memory 220 of FIG. 2 described below.

The motion sensor(s) 124 of FIGS. 1 and 2 sense(s), measure(s) and/or detect(s) motion data (e.g., movements, changes in position, changes in orientation, etc.) associated with a real environment (e.g., the real environment 100 of FIG. 1). For example, the motion sensor(s) 124 can sense, measure and/or detect depth data associated with one or more real object(s) (e.g., a whiteboard, a framed picture, a human, etc.) located within the real environment. The motion sensor(s) 124 of FIG. 1 can be implemented by any number (e.g., 1, 2, 3, etc.) of depth cameras, RADAR sensors, LIDAR sensors, infrared sensors, TOF sensors, acoustic sensors, tactile sensors, conductance sensors, accelerometers, gyroscopes, compasses, etc. Motion data sensed, measured and/or detected by the motion sensor(s) 124 may be associated with one or more local time(s) (e.g., time stamped) at which the data was collected by the motion sensor(s) 124. Motion data sensed, measured and/or detected by the motion sensor(s) 124 may be of any quantity, type, form and/or format, and may be stored in a computer-readable storage medium such as the example memory 220 of FIG. 2 described below.

The projector 104 of FIGS. 1 and 2 projects and/or displays one or more AR enhancement(s) (e.g., one or more AR extension(s) and/or object-intersecting AR content) to one or more real object(s) located and/or positioned within a real environment (e.g., the real environment 100 of FIG. 1). In some examples, the projector 104 of FIGS. 1 and 2 may be implemented as a digital projector capable of projecting and/or displaying digital content (e.g., digital images and/or digital videos including textual and/or graphical information). The projector 104 of FIGS. 1 and 2 projects and/or displays one or more AR enhancement(s) via the example projection source 128 of FIGS. 1 and 2. The projection source 128 may be implemented as a projection lens operatively coupled to and/or operatively aligned with a projection lamp. The projection controller 130 of FIGS. 1 and 2 controls the position and/or orientation of the projection source 128 and/or, more generally, the projector 104 of FIGS. 1 and 2. For example, the projection controller 130 may adjust, move and/or otherwise change the position and/or orientation of the projection source 128 from a current position and/or orientation to a target position and/or orientation to facilitate the projection of an AR enhancement to one or more real object(s) located within a real environment (e.g., the real environment 100 of FIG. 1). AR enhancements and/or AR enhancement data accessed, invoked, applied, processed and/or projected by the projection source 128 and the projection controller 130 and/or, more generally, by the projector 104 may be of any quantity, type, form and/or format, and may be stored in a computer-readable storage medium such as the example memory 220 of FIG. 2 described below.

The example sensor manager 202 of FIG. 2 manages and/or controls the operation of the depth sensor(s) 122 and/or the motion sensor(s) 124 of the sensor array 102 of FIGS. 1 and 2 and/or, more generally, manages and/or controls the process of accessing and/or obtaining depth data and/or motion data. For example, the sensor manager 202 may signal, command and/or instruct the depth sensor(s) 122 and/or the motion sensor(s) 124 to collect depth data and/or motion data at a specified time, and/or in response to the occurrence of a specified event. In some examples, the sensor manager 202 of FIG. 2 signals, commands and/or instructs the depth sensor(s) 122 and/or the motion sensor(s) 124 of FIGS. 1 and 2 to collect depth data and/or motion data in response to one or more user input(s) received via the example user interface 218 of FIG. 2 described below. Depth data and/or motion data accessed, obtained, received and/or processed by and/or at the sensor manager 202 may be of any quantity, type, form and/or format, and may be stored in a computer-readable storage medium such as the example memory 220 of FIG. 2 described below.

The example map generator 204 of FIG. 2 generates a map of a real environment based on depth data associated with the real environment. For example, the map generator 204 may generate a map (e.g., a three-dimensional spatial model) of the real environment 100 of FIG. 1 based on depth data obtained from the depth sensor(s) 122 of the sensor array 102 of FIGS. 1 and 2. The map generated by the map generator 204 of FIG. 2 includes a representation of one or more boundary surface(s) of the real environment, and/or one or more real object(s) located and/or positioned within the real environment. For example, the map generated by the map generator 204 of FIG. 2 may include a representation of the floor 108, the ceiling 110, the first wall 112, and/or the second wall 114 of the real environment 100 of FIG. 1, and/or one or more of the first real object 116, the second real object 118, and/or the third real object 120 located and/or positioned within the real environment 100 of FIG. 1. In some examples, the map generated by the map generator 204 of FIG. 2 illustrates, provides and/or identifies relative locations and/or relative positions of respective ones of the boundary surface(s) and/or respective ones of the real object(s) within the real environment 100. Maps and/or map data generated and/or processed by and/or at the map generator 204 may be of any quantity, type, form and/or format, and may be stored in a computer-readable storage medium such as the example memory 220 of FIG. 2 described below.

The example object detector 206 of FIG. 2 detects one or more real object(s) located in a real environment based on the map generated by the map generator 204 of FIG. 2. In some examples, the object detector 206 of FIG. 2 detects the one or more real object(s) located in the real environment by applying one or more object detection and/or computer vision algorithm(s) to the map of the real environment generated by the map generator 204 of FIG. 2. For example, the object detector 206 of FIG. 2 may detect one or more of the real object(s) (e.g., the first real object 116, the second real object 118, and/or the third real object 120 of FIG. 1) located in the real environment 100 of FIG. 1 by applying one or more object detection and/or computer vision algorithm(s) to the map of the real environment 100 of FIG. 1 generated by the map generator 204 of FIG. 2.

In some examples, the object detection and/or computer vision algorithm(s) applied by the object detector 206 of FIG. 2 distinguish(es) real objects of the real environment represented by the map from boundary surfaces of the real environment represented by the map. For example, the object detection and/or computer vision algorithm(s) applied by the object detector 206 of FIG. 2 may distinguish the real objects (e.g., the first real object 116, the second real object 118, and the third real object 120 of FIG. 1) of the real environment 100 of FIG. 1 represented by the map from the boundary surfaces (e.g., the floor 108, the ceiling 110, the first wall 112, and the second wall 114 of FIG. 1) of the real environment 100 of FIG. 1 represented by the map. In such examples, the object detector 206 of FIG. 2 detects the real objects, but does not detect the boundary surfaces.

In some examples, the object detection and/or computer vision algorithm(s) applied by the object detector 206 of FIG. 2 additionally distinguish(es) non-human real objects of the real environment represented by the map from human real objects of the real environment represented by the map. For example, the object detection and/or computer vision algorithm(s) applied by the object detector 206 of FIG. 2 may distinguish the non-human real objects (e.g., the first real object 116 and the second real object 118 of FIG. 1) of the real environment 100 of FIG. 1 represented by the map from the human real objects (e.g., the third real object 120 of FIG. 1) of the real environment 100 of FIG. 1 represented by the map. In such examples, the object detector 206 of FIG. 2 detects the non-human real objects, but does not detect the human real objects. Object detection data, object detection algorithms, and/or computer vision algorithms accessed, implemented, invoked, applied, detected and/or processed by and/or at the object detector 206 may be of any quantity, type, form and/or format, and may be stored in a computer-readable storage medium such as the example memory 220 of FIG. 2 described below.

The example object identifier 208 of FIG. 2 semantically identifies the real object(s) detected by the object detector 206 of FIG. 2. In some examples, the object identifier 208 of FIG. 2 semantically identifies (e.g., labels, tags, and/or classifies) respective ones of the real object(s) detected by the object detector 206 of FIG. 2 by applying a semantic identification algorithm to the real object(s) detected by the object detector 206 of FIG. 2 as represented by the map generated by the map generator 204 of FIG. 2. For example, the object identifier 208 of FIG. 2 may apply one or more semantic identification algorithm(s) to the real object(s) (e.g., the first real object 116, the second real object 118, and/or the third real object 120) detected by the object detector 206 of FIG. 2 as represented by the map of the real environment 100 of FIG. 1 generated by the map generator 204 of FIG. 2. In such an example, the semantic identification algorithm(s) applied by the object identifier 208 of FIG. 2 may semantically identify the first real object 116 of FIG. 1 as a whiteboard, the second real object 118 of FIG. 1 as a framed picture, and/or the third real object 120 of FIG. 1 as a human and/or user. In some examples, the semantic identification algorithm(s) applied by the object identifier 208 of FIG. 2 may further semantically identify one or more physical boundaries and/or physical properties (e.g., a size, a shape, a color, an edge, a contour, a texture, etc.) of respective ones of the real object(s). Semantic identification data and/or semantic identification algorithms accessed, implemented, invoked, applied, generated and/or processed by and/or at the object identifier 208 may be of any quantity, type, form and/or format, and may be stored in a computer-readable storage medium such as the example memory 220 of FIG. 2 described below.

The example gesture detector 210 of FIG. 2 detects one or more occurrence(s) of one or more user gesture(s) within a real environment based on motion data associated with the real environment. For example, the gesture detector 210 may detect one or more occurrence(s) of one or more user gesture(s) (e.g., one or more hand, arm, foot or leg gesture(s) made by a human) within the real environment 100 of FIG. 1 based on motion data generated by and obtained from the motion sensor(s) 124 of the sensor array 102 of FIGS. 1 and 2. In some examples, the gesture detector 210 of FIG. 2 detects the occurrence(s) of the user gesture(s) within the real environment by applying one or more movement recognition and/or computer vision algorithm(s) to the motion data associated with the real environment. For example, the gesture detector 210 of FIG. 2 may detect the occurrence(s) of the user gesture(s) within the real environment 100 of FIG. 1 by applying one or more object detection and/or computer vision algorithm(s) to the motion data obtained from the motion sensor(s) 124 of the sensor array 102 of FIGS. 1 and 2.

In some examples, the movement recognition and/or computer vision algorithm(s) applied by the gesture detector 210 of FIG. 2 distinguish(es) human movements (e.g., user gestures) from non-human movements (e.g., non-human real object movements). For example, the movement recognition and/or computer vision algorithm(s) applied by the gesture detector 210 of FIG. 2 may distinguish a movement of the third real object 120 (e.g., a movement of the hand 134 of the human corresponding to the third real object 120) of FIG. 1 from a movement of the second real object 118 (e.g., a movement of the framed picture corresponding to the second real object 118) of FIG. 1. In such examples, the gesture detector 210 of FIG. 2 detects the human movements, but does not detect the non-human movements. User gesture detection data, movement recognition algorithms, and/or computer vision algorithms accessed, implemented, invoked, applied, detected and/or processed by and/or at the object detector 206 may be of any quantity, type, form and/or format, and may be stored in a computer-readable storage medium such as the example memory 220 of FIG. 2 described below.

The example gesture identifier 212 of FIG. 2 semantically identifies the user gesture(s) detected by the gesture detector 210 of FIG. 2. In some examples, the gesture identifier 212 of FIG. 2 semantically identifies (e.g., labels, tags, and/or classifies) respective ones of the user gesture(s) detected by the gesture detector 210 of FIG. 2 by applying one or more semantic identification algorithm(s) to the user gesture(s). For example, the gesture identifier 212 of FIG. 2 may apply one or more semantic identification algorithm(s) to the user gesture(s) detected by the gesture detector 210 of FIG. 2 as occurring within the real environment 100 of FIG. 1. In such an example, the semantic identification algorithm(s) applied by the gesture identifier 212 of FIG. 2 may semantically identify respective ones or the user gesture(s) as one of a touch input, a virtual drawing, or a physical drawing. In some examples, the semantic identification algorithm(s) applied by the gesture identifier 212 of FIG. 2 may further semantically identify one or more physical boundaries and/or physical properties (e.g., a size, a shape, an edge, a contour, etc.) of respective ones of the user gesture(s). Semantic identification data and/or semantic identification algorithms accessed, implemented, invoked, applied, generated and/or processed by and/or at the gesture identifier 212 may be of any quantity, type, form and/or format, and may be stored in a computer-readable storage medium such as the example memory 220 of FIG. 2 described below.

The example target object determiner 214 of FIG. 2 determines one or more target real object(s) associated with the user gesture(s) detected by the gesture detector 210 of FIG. 2 based on the user gesture(s), and further based on the map of the real environment generated by the map generator 204 of FIG. 2 and/or the real object(s) detected by the object detector 206 of FIG. 2. For example, the target object determiner 214 of FIG. 2 may determine a target real object associated with a user gesture detected by the gesture detector 210 of FIG. 2 based the user gesture, and further based on the map of the real environment 100 of FIG. 1 generated by the map generator 204 of FIG. 2 and/or the real object(s) detected by the object detector 206 of FIG. 2. In some examples, the target object determiner 214 of FIG. 2 determines a target real object associated with a user gesture from among the real object(s) represented by the map generated by the map generator 204 of FIG. 2 and/or detected by the object detector 206 of FIG. 2 by identifying the target real object as the one of the real object(s) (e.g., the one of the non-human real object(s)) that is most proximate relative to the user gesture. For example, the target object determiner 214 of FIG. 2 may determine, based on the user gesture, and further based on the map of the real environment 100 of FIG. 1 generated by the map generator 204 of FIG. 2 and/or the real object(s) detected by the object detector 206 of FIG. 2, that the user gesture occurring within the real environment 100 of FIG. 1 is more proximate to the second real object 118 (e.g., the framed picture) of FIG. 1 than to the first real object 116 (e.g., the whiteboard) of FIG. 1. In such an example, the target object determiner 214 of FIG. 2 identifies the second real object 118 as the target real object associated with the user gesture. Target object data determined, generated and/or processed by and/or at the target object determiner 214 may be of any quantity, type, form and/or format, and may be stored in a computer-readable storage medium such as the example memory 220 of FIG. 2 described below.

The example enhancement determiner 216 of FIG. 2 determines one or more AR enhancement(s) (e.g., AR extension(s) and/or object-intersecting AR content) based on the user gesture(s) detected by the gesture detector 210 of FIG. 2 and the target real object(s) determined by the target object determiner 214 of FIG. 2. In some examples, the enhancement determiner 216 of FIG. 2 determines the AR enhancement(s) by implementing, invoking and/or applying an AR enhancement model structured as a set of semantic rules that are configured to guide interactions and/or relationships between AR enhancement(s) associated with the user gesture(s) on the one hand, and the target real object(s) associated with the user gesture(s) on the other hand. In such examples, the user gesture(s) and the target real object(s) are inputs to the AR enhancement model. In some such examples, the AR enhancement model further incorporates the map generated by the map generator 204 of FIG. 2, the real object(s) detected by the object detector 206 of FIG. 2, the semantic identification(s) of the real object(s) generated (e.g., semantically identified) by the object identifier 208 of FIG. 2, and/or the semantic identification(s) of the user gesture(s) generated (e.g., semantically identified) by the gesture identifier 212 of FIG. 2 as inputs to the AR enhancement model.

The AR enhancement model implemented, invoked and/or applied by the enhancement determiner 216 of FIG. 2 determines and/or outputs one or more AR enhancement(s) based on the specific content of the inputs described above. In some examples, the AR enhancement(s) determined by the enhancement determiner 216 of FIG. 2 include(s) at least one of a virtual resizing of a target real object, a virtual structure associated with (e.g., intersecting) a target real object, or a virtual character associated with (e.g., intersecting) a target real object. Examples of AR enhancements determined by the enhancement determiner 216 of FIG. 2 are further described below in connection with FIGS. 3A-3B, 4A-4C, 5A-5C, 6A-6D and 7A-7B.

As mentioned above, the enhancement determiner 216 of FIG. 2 includes the context evaluator 222 and the physics simulator 224 of FIG. 2, each of which is further described below. In some examples, the context evaluator 222 and the physics simulator 224 of the enhancement determiner 216 of FIG. 2 are respectively implemented as part of the set of semantic rules which form the AR enhancement model that is implemented, invoked and/or applied by the enhancement determiner 216 of FIG. 2. In such examples, the context evaluator 222 and the physics simulator 224 of the enhancement determiner 216 of FIG. 2 are respectively configured to guide interactions and/or relationships between AR enhancement(s) associated with the user gesture(s) on the one hand, and the target real object(s) associated with the user gesture(s) on the other hand.

The example context evaluator 222 of FIG. 2 evaluates contextual information associated with the user gesture(s) detected by the gesture detector 210 of FIG. 2, and/or associated with the target real object(s) determined by the target object determiner 214 of FIG. 2. In some examples, the contextual information evaluated by the context evaluator 222 of FIG. 2 includes one or more portion(s) (including all) of the semantic identification(s) of the real object(s) generated (e.g., semantically identified) by the object identifier 208 of FIG. 2, and/or one or more portion(s) (including all) of the semantic identification(s) of the user gesture(s) generated (e.g., semantically identified) by the gesture identifier 212 of FIG. 2. For example, the context evaluator 222 of FIG. 2 may evaluate one or more physical boundaries and/or physical properties (e.g., a size, a shape, a color, an edge, a contour, a texture, etc.) of the user gesture(s) and/or of the target real object(s). The context evaluator 222 of FIG. 2 may additionally or alternatively evaluate one or more physical boundaries and/or physical properties associated with the map generated by the map generator 204 of FIG. 2.

The contextual evaluation(s) performed by the of context evaluator 222 of FIG. 2 evaluate(s) possible and/or probable contextual interactions between the user gesture(s), the target real object(s), and/or one or more potential (e.g., candidate) AR enhancement(s), and guide(s) the enhancement determiner 216 of FIG. 2 in determining a specific one of the potential (e.g., candidate) AR enhancement(s). For example, the enhancement determiner 216 of FIG. 2 may identify, select and/or determine a specific AR enhancement (e.g., an AR enhancement having a specific type, size, shape, color, orientation and/or location) to be projected by a projector located in a real environment based on the specific outcome(s), output(s) and/or result(s) of the contextual evaluation(s) performed by the context evaluator 222 of FIG. 2. Contextual information accessed, implemented, invoked, applied, evaluated, generated and/or processed by and/or at the context evaluator 222 may be of any quantity, type, form and/or format, and may be stored in a computer-readable storage medium such as the example memory 220 of FIG. 2 described below.

The example physics simulator 224 of FIG. 2 simulates physics associated with the user gesture(s) detected by the gesture detector 210 of FIG. 2, and/or associated with the target real object(s) determined by the target object determiner 214 of FIG. 2. In some examples, the physics simulated by the physics simulator 224 of FIG. 2 may be based on one or more portion(s) (including all) of the semantic identification(s) of the real object(s) generated (e.g., semantically identified) by the object identifier 208 of FIG. 2, and/or one or more portion(s) (including all) of the semantic identification(s) of the user gesture(s) generated (e.g., semantically identified) by the gesture identifier 212 of FIG. 2. For example, the physics simulator 224 of FIG. 2 may evaluate one or more physical boundaries and/or physical properties (e.g., a size, a shape, an edge, a contour, a texture, an orientation, a location, etc.) of the user gesture(s) and/or of the target real object(s). The physics simulator 224 of FIG. 2 may additionally or alternatively evaluate one or more physical boundaries and/or physical properties associated with the map generated by the map generator 204 of FIG. 2.

The physics simulation(s) performed by the of physics simulator 224 of FIG. 2 simulate(s) possible and/or probable physical interactions and/or relationships between the user gesture(s), the target real object(s), and/or one or more potential (e.g., candidate) AR enhancement(s), and guide(s) the enhancement determiner 216 of FIG. 2 in identifying, selecting and/or determining a specific one of the potential (e.g., candidate) AR enhancement(s). For example, the enhancement determiner 216 of FIG. 2 may identify, select and/or determine a specific AR enhancement (e.g., an AR enhancement having a specific type, size, shape, orientation and/or location) to be projected by a projector located in a real environment based on the specific outcome(s), output(s) and/or result(s) of the physics simulation(s) performed by the physics simulator 224 of FIG. 2. Physics data accessed, implemented, invoked, applied, simulated, generated and/or processed by and/or at the physics simulator 224 may be of any quantity, type, form and/or format, and may be stored in a computer-readable storage medium such as the example memory 220 of FIG. 2 described below.

In some examples, the enhancement determiner 216 of FIG. 2 commands a projector located within a real environment to project the AR enhancement(s) to the target real object(s). For example, the enhancement determiner 216 of FIG. 2 may command, instruct, and/or signal the projection source 128, the projection controller 130 and/or, more generally, the projector 104 of FIGS. 1 and 2 located within the real environment 100 of FIG. 1 in a manner that causes the projection source 128, the projection controller 130 and/or, more generally, the projector 104 of FIGS. 1 and 2 to project the AR enhancement(s), as determined by the enhancement determiner 216 of FIG. 2, to the target real object(s) located within the real environment 100 of FIG. 1. AR enhancement data and/or the AR enhancement model accessed, implemented, invoked, applied, generated and/or processed by and/or at the enhancement determiner 216 may be of any quantity, type, form and/or format, and may be stored in a computer-readable storage medium such as the example memory 220 of FIG. 2 described below.

The example user interface 218 of FIG. 2 facilitates interactions and/or communications between an end user and the AR enhancement apparatus 200. The user interface 218 includes one or more input device(s) 226 via which the user may input information and/or data to the AR enhancement apparatus 200. For example, the input device(s) 226 may include a button, a switch, a microphone, and/or a touchscreen that enable(s) the user to convey data and/or commands to the sensor array 102, the projector 104, the sensor manager 202, the map generator 204, the object detector 206, the object identifier 208, the gesture detector 210, the gesture identifier 212, the target object determiner 214, the enhancement determiner 216, the memory 220, the context evaluator 222, and/or the physics simulator 224 of FIG. 2, and/or, more generally, to the AR enhancement apparatus 200 of FIG. 2. The user interface 218 of FIG. 2 also includes one or more output device(s) 228 via which the user interface 218 presents information and/or data in visual and/or audible form to the user. For example, the output device(s) 228 may include a light emitting diode, a touchscreen, and/or a liquid crystal display for presenting visual information, and/or a speaker for presenting audible information. In some examples, the output device(s) 228 can be implemented by and/or as one or more AR output device(s) (e.g., an AR headset, AR glasses, etc.). Data and/or information that is presented and/or received via the user interface 218 may be of any quantity, type, form and/or format, and may be stored in a computer-readable storage medium such as the example memory 220 of FIG. 2 described below.

The example memory 220 of FIG. 2 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 220 may be stored in any file and/or data structure format, organization scheme, and/or arrangement.

In some examples, the memory 220 stores depth data sensed, measured and/or detected by the depth sensor(s) 122 of FIGS. 1 and 2. In some examples, the memory 220 stores motion data sensed, measured and/or detected by the motion sensor(s) 124 of FIGS. 1 and 2. In some examples, the memory 220 stores depth data and/or motion data accessed, obtained, received and/or processed by and/or at the sensor manager 202 of FIG. 2. In some examples, the memory 220 stores maps and/or map data generated and/or processed by and/or at the map generator 204 of FIG. 2. In some examples, the memory 220 stores object detection data, object detection algorithms, and/or computer vision algorithms accessed, implemented, invoked, applied, detected and/or processed by and/or at the object detector 206 of FIG. 2. In some examples, the memory 220 stores semantic identification data and/or semantic identification algorithms accessed, implemented, invoked, applied, generated and/or processed by and/or at the object identifier 208 of FIG. 2. In some examples, the memory 220 stores user gesture detection data, movement recognition algorithms, and/or computer vision algorithms accessed, implemented, invoked, applied, detected and/or processed by and/or at the gesture detector 210 of FIG. 2. In some examples, the memory 220 stores semantic identification data and/or semantic identification algorithms accessed, implemented, invoked, applied, generated and/or processed by and/or at the gesture identifier 212 of FIG. 2. In some examples, the memory 220 stores target object data determined, generated and/or processed by and/or at the target object determiner 214 of FIG. 2. In some examples, the memory 220 stores AR enhancement data and/or AR enhancement models accessed, implemented, invoked, applied, generated and/or processed by and/or at the enhancement determiner 216 of FIG. 2. In some examples, the memory 220 stores contextual information accessed, implemented, invoked, applied, evaluated, generated and/or processed by and/or at the context evaluator 222 of FIG. 2. In some examples, the memory 220 stores physics data accessed, implemented, invoked, applied, simulated, generated and/or processed by and/or at the physics simulator 224 of FIG. 2. In some examples, the memory 220 stores data and/or information that is presented and/or received via the user interface 218 of FIG. 2.

The memory 220 of FIG. 2 is accessible to the sensor array 102 (including the depth sensor(s) 122 and the motion sensor(s) 124), the projector 104 (including the projection source 128 and the projection controller 130), the sensor manager 202, the map generator 204, the object detector 206, the object identifier 208, the gesture detector 210, the gesture identifier 212, the target object determiner 214, the enhancement determiner 216 (including the context evaluator 222 and the physics simulator 224), and/or the user interface 218 (including the input device(s) 226 and the output device(s) 228) of FIG. 2, and/or, more generally, to the AR enhancement apparatus 200 of FIG. 2.

The sensor array 102 of FIGS. 1 and 2 is structured to sense, measure and/or detect depth data and/or motion data associated with a real environment. The depth sensor(s) 122 of FIGS. 1 and 2 is/are structured to sense, measure and/or detect depth data associated with a real environment. The motion sensor(s) 124 of FIGS. 1 and 2 is/are structured to sense, measure and/or detect motion data associated with a real environment. The projector 104 of FIGS. 1 and 2 is structured to project one or more AR enhancements in a real environment. The projection source 128 of FIGS. 1 and 2 is structured to project one or more AR enhancements from the projector 104 of FIGS. 1 and 2. The projection controller 130 of FIGS. 1 and 2 is structured to control an orientation of the projection source 128 and/or the projector 104 of FIGS. 1 and 2 within a real environment.

The sensor manager 202 of FIG. 2 is structured to obtain depth data and/or motion data from the depth sensor(s) 122 and/or the motion sensor(s) 124 of FIGS. 1 and 2 and/or, more generally, from the sensor array 102 of FIGS. 1 and 2. The map generator 204 of FIG. 2 is structured to generate a map of a real environment based on depth data obtained from the depth sensor(s) 122 of FIGS. 1 and 2 and/or, more generally, from the sensor array 102 of FIGS. 1 and 2. The object detector 206 of FIG. 2 is structured to detect one or more real object(s) based on the map generated by the map generator 204 of FIG. 2. The object identifier 208 of FIG. 2 is structured to semantically identify the real object(s) detected by the object detector 206 of FIG. 2. The gesture detector 210 of FIG. 2 is structured to detect one or more user gesture(s) based on motion data generated by and obtained from the motion sensor(s) 124 of FIGS. 1 and 2 and/or, more generally, from the sensor array 102 of FIGS. 1 and 2. The gesture identifier 212 of FIG. 2 is structured to semantically identify the user gesture(s) detected by the gesture detector 210 of FIG. 2. The target object determiner 214 of FIG. 2 is structured to determine one or more target real object(s) associated with the user gesture(s) detected by the gesture detector 210 of FIG. 2.

The enhancement determiner 216 of FIG. 2 is structured to determine one or more AR enhancement(s) based on the user gesture(s) detected by the gesture detector 210 of FIG. 2 and the associated target real object(s) determined by the target object determiner 214 of FIG. 2. The context evaluator 222 of FIG. 2 is structured to evaluate contextual information associated with the user gesture(s) detected by the gesture detector 210 of FIG. 2 and/or the associated target real object(s) determined by the target object determiner 214 of FIG. 2. The physics simulator 224 of FIG. 2 is structured to simulate physics associated with the user gesture(s) detected by the gesture detector 210 of FIG. 2 and the associated target real object(s) determined by the target object determiner 214 of FIG. 2.

The user interface 218 of FIG. 2 is structured to facilitate interactions and/or communications between an end user and the AR enhancement apparatus 200 of FIG. 2. The input device(s) 226 of FIG. 2 is/are structured to input information and/or data to the AR enhancement apparatus 200 of FIG. 2. The output device(s) 228 of FIG. 2 is/are structured to present information and/or data in visual and/or audible form via the AR enhancement apparatus 200 of FIG. 2. The memory 220 of FIG. 2 is structured to store data, information, algorithms and/or models detected, identified, determined, generated, accessed, implemented, invoked, applied and/or processed by the AR enhancement apparatus 200 of FIG. 2 and/or any of the components thereof.

Figure 3A:
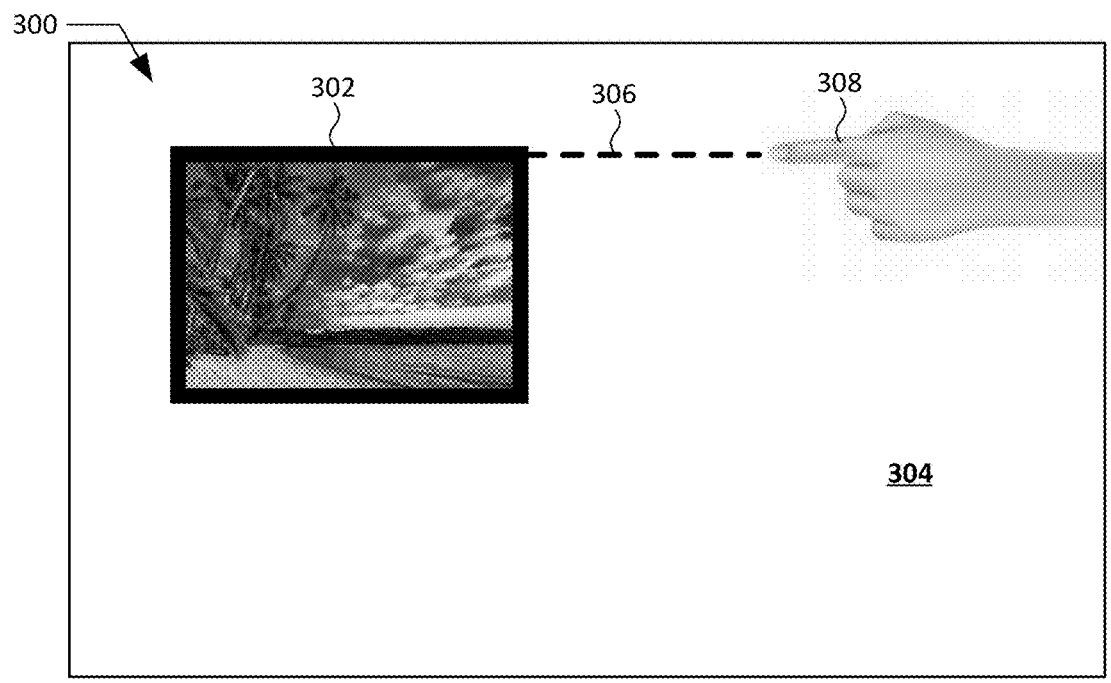
FIGS. 3A and 3B illustrate a first example of the AR enhancement apparatus 200 of FIG. 2 projecting an AR enhancement to a real object located within a real environment in response to an occurrence of a user gesture detected in the real environment.
Figure 3B:
Figure 3B:
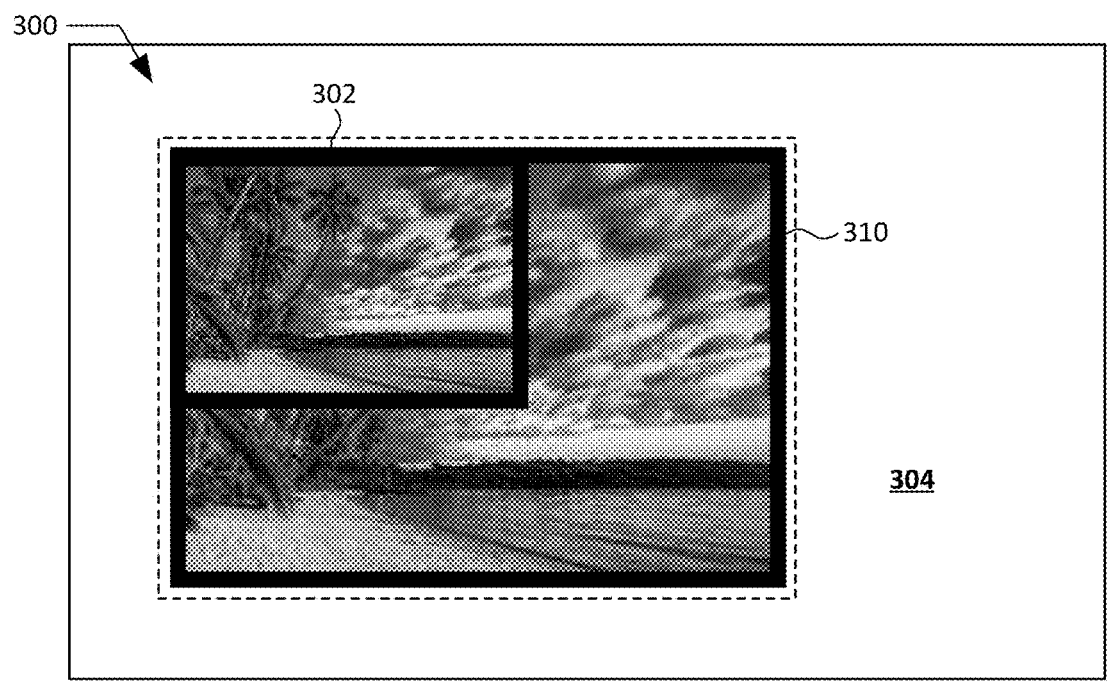

FIGS. 3A and 3B illustrate a first example of the AR enhancement apparatus 200 of FIG. 2 projecting an AR enhancement to a real object located within a real environment in response to an occurrence of a user gesture detected in the real environment. As shown in FIG. 3A, an example real environment 300 includes an example real object 302 (e.g., a framed picture) located and/or positioned (e.g., mounted) on an example wall 304 of the real environment 300. As further shown in FIG. 3A, an example user gesture 306 (represented as a dashed line) associated with an example hand 308 of a human (e.g., a user) has been made along the wall 304 of the real environment 300 extending away from the real object 302.

In connection with the illustrated example of FIGS. 3A and 3B, the map generator 204 of FIG. 2 generates a map of the real environment 300, the object detector 206 of FIG. 2 detects the real object 302, and the object identifier 208 of FIG. 2 semantically identifies the real object 302 as a framed picture. The gesture detector 210 of FIG. 2 detects the user gesture 306, the gesture identifier 212 of FIG. 2 semantically identifies the user gesture 306 as a touch input indicative of a request to resize (e.g., enlarge or expand) the real object 302, and the target object determiner 214 of FIG. 2 determines that the real object 302 is the target real object. The enhancement determiner 216 of FIG. 2 has determined an example AR enhancement 310, and has commanded a projector to project the AR enhancement 310. As shown in FIG. 3B, the AR enhancement 310 is projected on the wall 304 of the real environment 300 as an enhancement and/or extension to the real object 302, with the AR enhancement 310 being projected as a resizing (e.g., expansion and/or extension) of the real object 302 that intersects the real object 302.

Figure 4A:
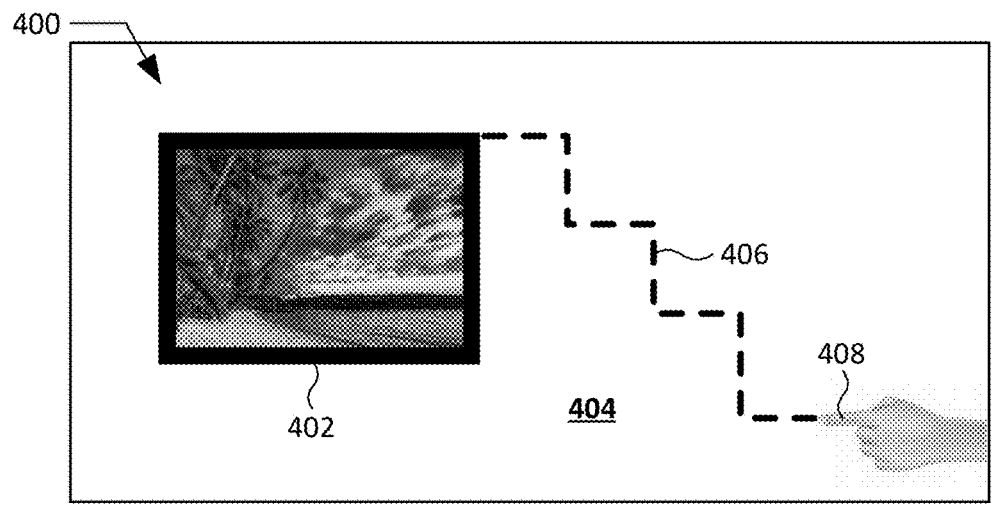
FIGS. 4A, 4B and 4C illustrate a second example of the AR enhancement apparatus 200 of FIG. 2 projecting an AR enhancement to a real object located within a real environment in response to an occurrence of a user gesture detected in the real environment.
Figure 4B:
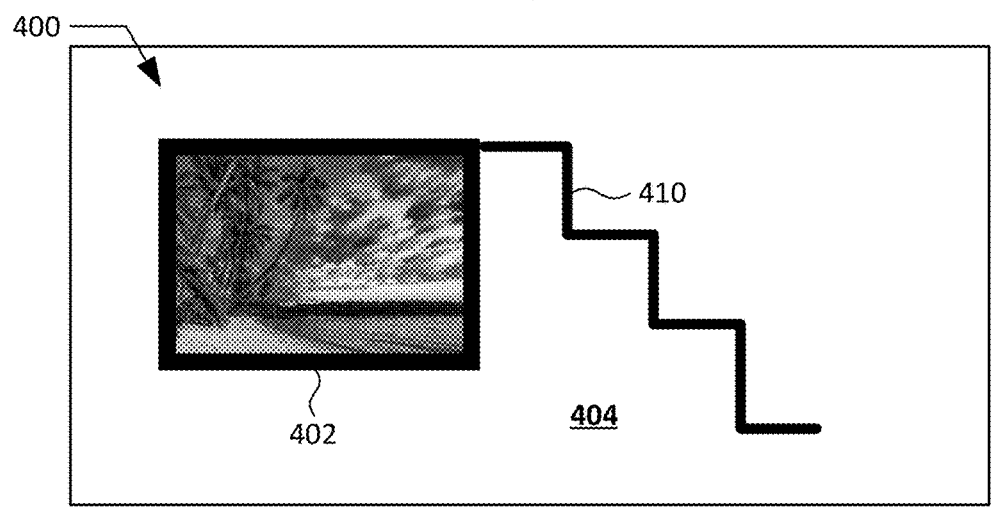
Figure 4C:
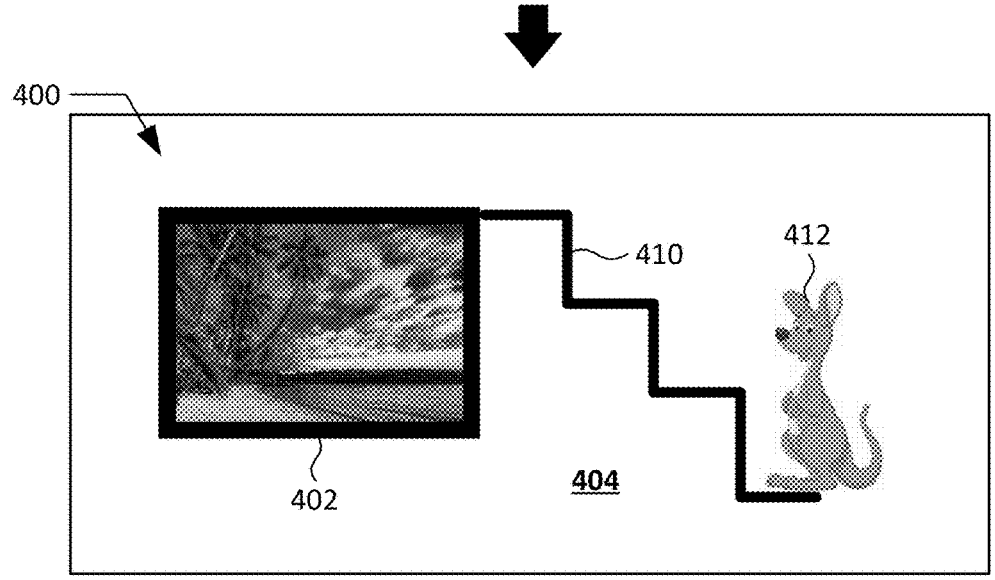

FIGS. 4A, 4B and 4C illustrate a second example of the AR enhancement apparatus 200 of FIG. 2 projecting an AR enhancement to a real object located within a real environment in response to an occurrence of a user gesture detected in the real environment. As shown in FIG. 4A, an example real environment 400 includes an example real object 402 (e.g., a framed picture) located and/or positioned (e.g., mounted) on an example wall 404 of the real environment 400. As further shown in FIG. 4A, an example user gesture 406 (represented as a dashed line) associated with an example hand 408 of a human (e.g., a user) has been made along the wall 404 of the real environment 400 extending away from the real object 402.

In connection with the illustrated example of FIGS. 4A, 4B and 4C, the map generator 204 of FIG. 2 generates a map of the real environment 400, the object detector 206 of FIG. 2 detects the real object 402, and the object identifier 208 of FIG. 2 semantically identifies the real object 402 as a framed picture. The gesture detector 210 of FIG. 2 detects the user gesture 406, the gesture identifier 212 of FIG. 2 semantically identifies the user gesture 406 as a virtual drawing indicative of a request to add steps extending away from the real object 402, and the target object determiner 214 of FIG. 2 determines that the real object 402 is the target real object. The enhancement determiner 216 of FIG. 2 has determined a first example AR enhancement 410 and a second example AR enhancement 412, and has commanded a projector to respectively project the first AR enhancement 410 and the second AR enhancement 412. As shown in FIG. 4B, the first AR enhancement 410 is projected on the wall 404 of the real environment 400 as an enhancement and/or extension to the real object 402, with the first AR enhancement 410 being projected as steps that intersect the real object 402. As shown in FIG. 4C, the second AR enhancement 412 is projected on the wall 404 of the real environment 400 as an enhancement and/or extension to the first AR enhancement 410 and/or the real object 402, with the second AR enhancement 412 being projected as a character (e.g., a kangaroo) that intersects the first AR enhancement 410.

Figure 5A:
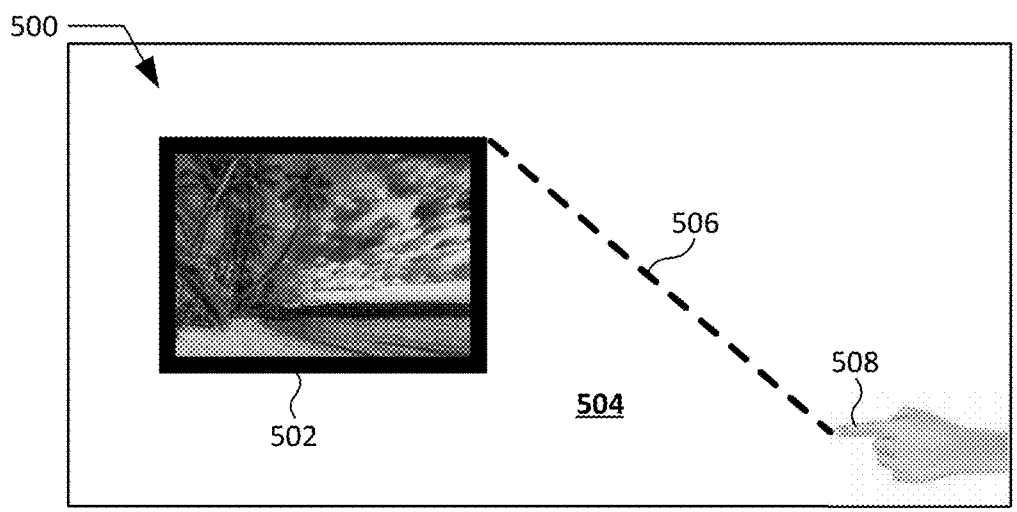
FIGS. 5A, 5B and 5C illustrate a third example of the AR enhancement apparatus 200 of FIG. 2 projecting an AR enhancement to a real object located within a real environment in response to an occurrence of a user gesture detected in the real environment.
Figure 5B:
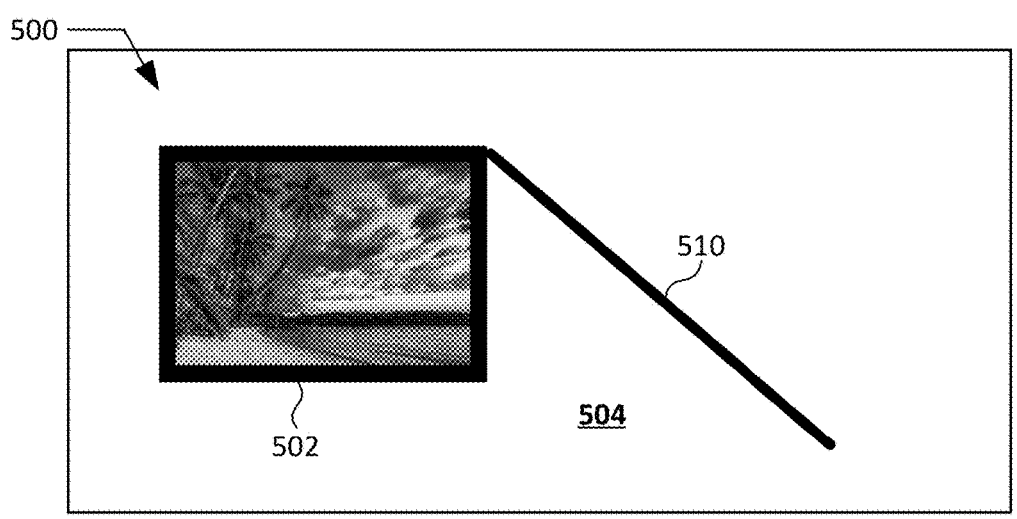
Figure 5C:
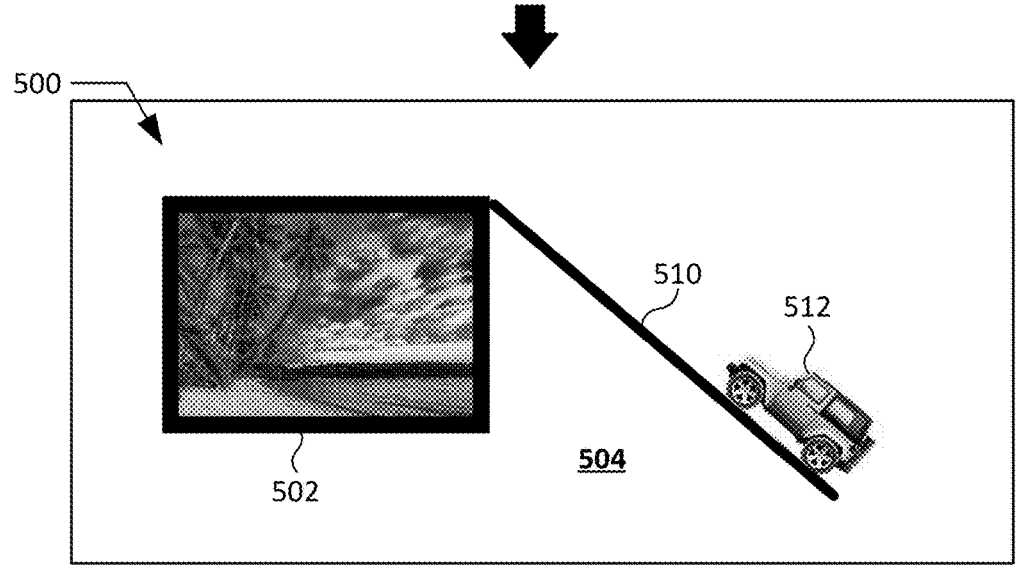

FIGS. 5A, 5B and 5C illustrate a third example of the AR enhancement apparatus 200 of FIG. 2 projecting an AR enhancement to a real object located within a real environment in response to an occurrence of a user gesture detected in the real environment. As shown in FIG. 5A, an example real environment 500 includes an example real object 502 (e.g., a framed picture) located and/or positioned (e.g., mounted) on an example wall 504 of the real environment 500. As further shown in FIG. 5A, an example user gesture 506 (represented as a dashed line) associated with an example hand 508 of a human (e.g., a user) has been made along the wall 504 of the real environment 500 extending away from the real object 402.

In connection with the illustrated example of FIGS. 5A, 5B and 5C, the map generator 204 of FIG. 2 generates a map of the real environment 500, the object detector 206 of FIG. 2 detects the real object 502, and the object identifier 208 of FIG. 2 semantically identifies the real object 502 as a framed picture. The gesture detector 210 of FIG. 2 detects the user gesture 506, the gesture identifier 212 of FIG. 2 semantically identifies the user gesture 506 as a virtual drawing indicative of a request to add a ramp extending away from the real object 502, and the target object determiner 214 of FIG. 2 determines that the real object 502 is the target real object. The enhancement determiner 216 of FIG. 2 has determined a first example AR enhancement 510 and a second example AR enhancement 512, and has commanded a projector to respectively project the first AR enhancement 510 and the second AR enhancement 512. As shown in FIG. 5B, the first AR enhancement 510 is projected on the wall 504 of the real environment 500 as an enhancement and/or extension to the real object 502, with the first AR enhancement 510 being projected as a ramp that intersect the real object 502. As shown in FIG. 5C, the second AR enhancement 512 is projected on the wall 504 of the real environment 500 as an enhancement and/or extension to the first AR enhancement 510 and/or the real object 502, with the second AR enhancement 512 being projected as a character (e.g., a toy jeep) that intersects the first AR enhancement 510.

Figure 6C:
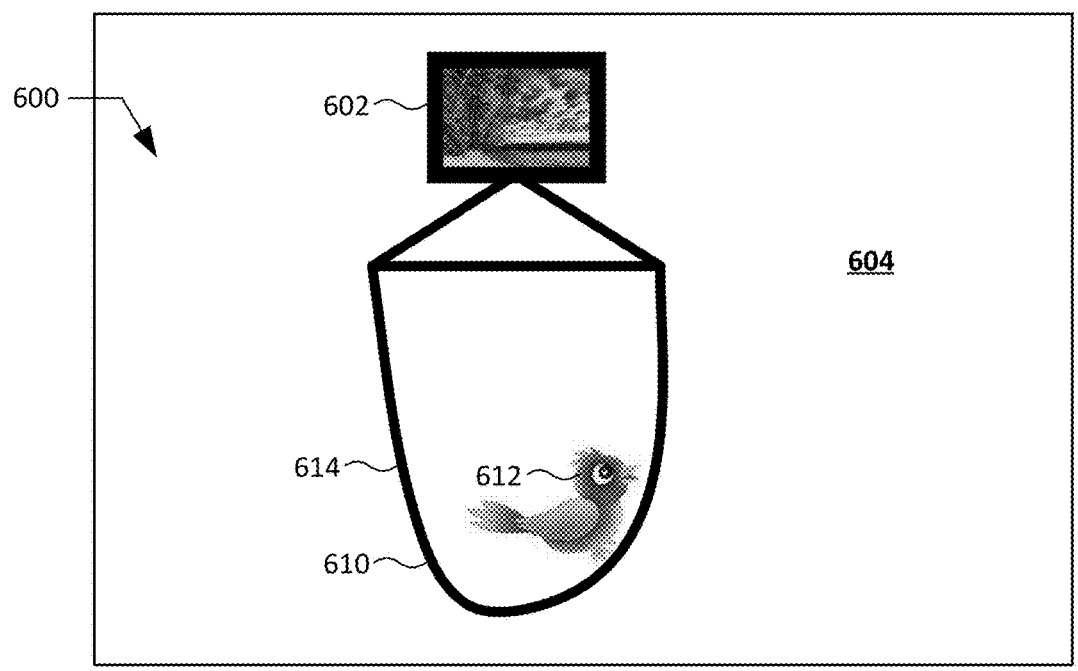

FIGS. 6A, 6B, 6C and 6D illustrate a fourth example of the AR enhancement apparatus 200 of FIG. 2 projecting an AR enhancement to a real object located within a real environment in response to an occurrence of a user gesture detected in the real environment. As shown in FIG. 6A, an example real environment 600 includes an example real object 602 (e.g., a framed picture) located and/or positioned (e.g., mounted) on an example wall 604 of the real environment 600. As further shown in FIG. 6A, an example user gesture 606 (represented as a dashed line) associated with an example hand 608 of a human (e.g., a user) has been made along the wall 604 of the real environment 600 extending downwardly from the real object 602.

In connection with the illustrated example of FIGS. 6A, 6B, 6C and 6D, the map generator 204 of FIG. 2 generates a map of the real environment 600, the object detector 206 of FIG. 2 detects the real object 602, and the object identifier 208 of FIG. 2 semantically identifies the real object 602 as a framed picture. The gesture detector 210 of FIG. 2 detects the user gesture 606, the gesture identifier 212 of FIG. 2 semantically identifies the user gesture 606 as a virtual drawing indicative of a request to add a movable (e.g., swingable) platform extending downwardly from the real object 602, and the target object determiner 214 of FIG. 2 determines that the real object 602 is the target real object. The enhancement determiner 216 of FIG. 2 has determined a first example AR enhancement 610 and a second example AR enhancement 612, and has commanded a projector to respectively project the first AR enhancement 610 and the second AR enhancement 612. As shown in FIG. 6B, the first AR enhancement 610 is projected on the wall 604 of the real environment 600 as an enhancement and/or extension to the real object 602, with the first AR enhancement 610 being projected as a movable (e.g., swingable) platform that intersects the real object 602. As shown in FIG. 6C, the second AR enhancement 612 is projected on the wall 604 of the real environment 600 as an enhancement and/or extension to the first AR enhancement 610 and/or the real object 602, with the second AR enhancement 612 being projected as a character (e.g., a bird) that intersects the first AR enhancement 610.

Figure 6D:
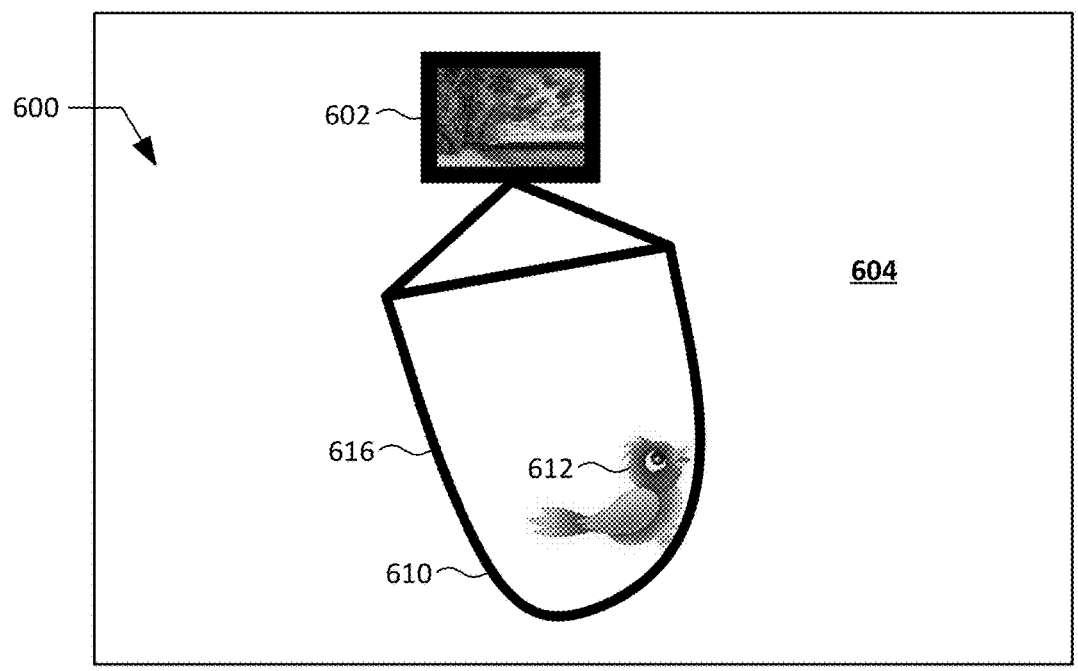

As further shown in FIG. 6C, the first AR enhancement 610 is projected on the wall 604 of the real environment 600 in a first example orientation and/or position 614. As shown in FIG. 6D, the first AR enhancement 610 is projected on the wall 604 of the real environment 600 in a second example orientation and/or position 616 that differs from the first example orientation and/or position 614 of the first AR enhancement 610 shown in FIG. 6C. In the illustrated example of FIGS. 6C and 6D, the migration of the projection of the first AR enhancement 610 from the first orientation and/or position 614 of FIG. 6C to the second orientation and/or position 616 of FIG. 6D results from the interaction of the second AR enhancement 612 with the first AR enhancement 610, as determined by the context evaluator 222 and/or the physics simulator 224 of the enhancement determiner 216 of FIG. 2. For example, movement of the first AR enhancement 610 may be governed by contextual information and/or simulated physics associated with the first AR enhancement 610 relative to the real object 602, and/or by contextual information and/or simulated physics associated with the second AR enhancement 612 relative to the first AR enhancement 610.

Figure 7A:
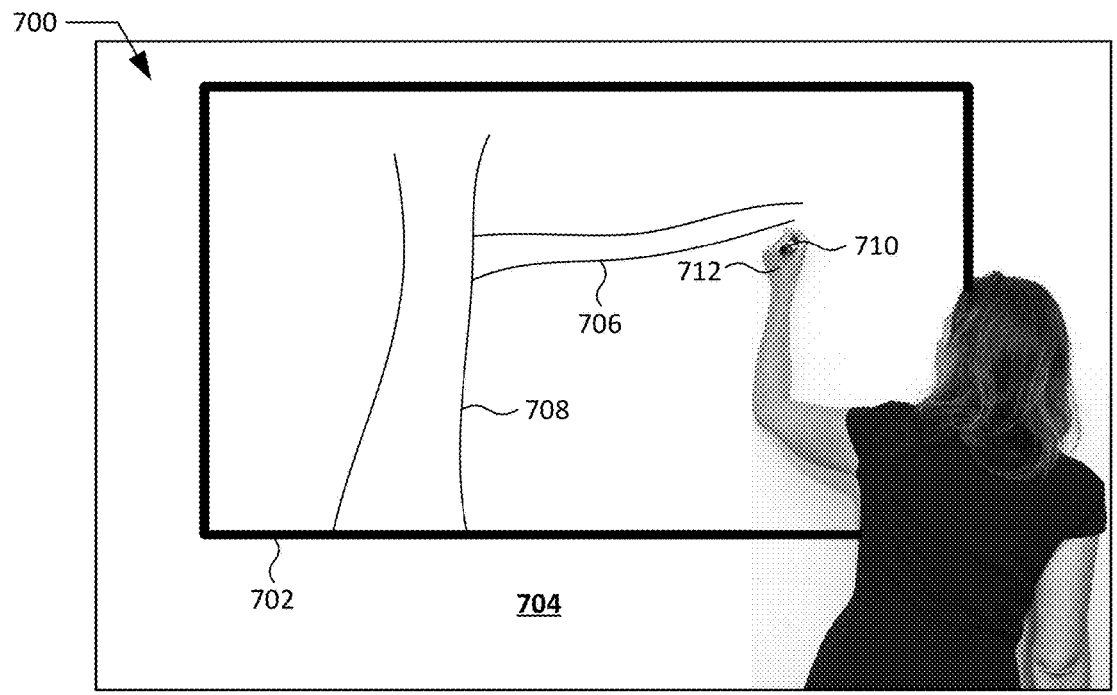
FIGS. 7A and 7B illustrate a fifth example of the AR enhancement apparatus 200 of FIG. 2 projecting an AR enhancement to a real object located within a real environment in response to an occurrence of a user gesture detected in the real environment.
Figure 7B:
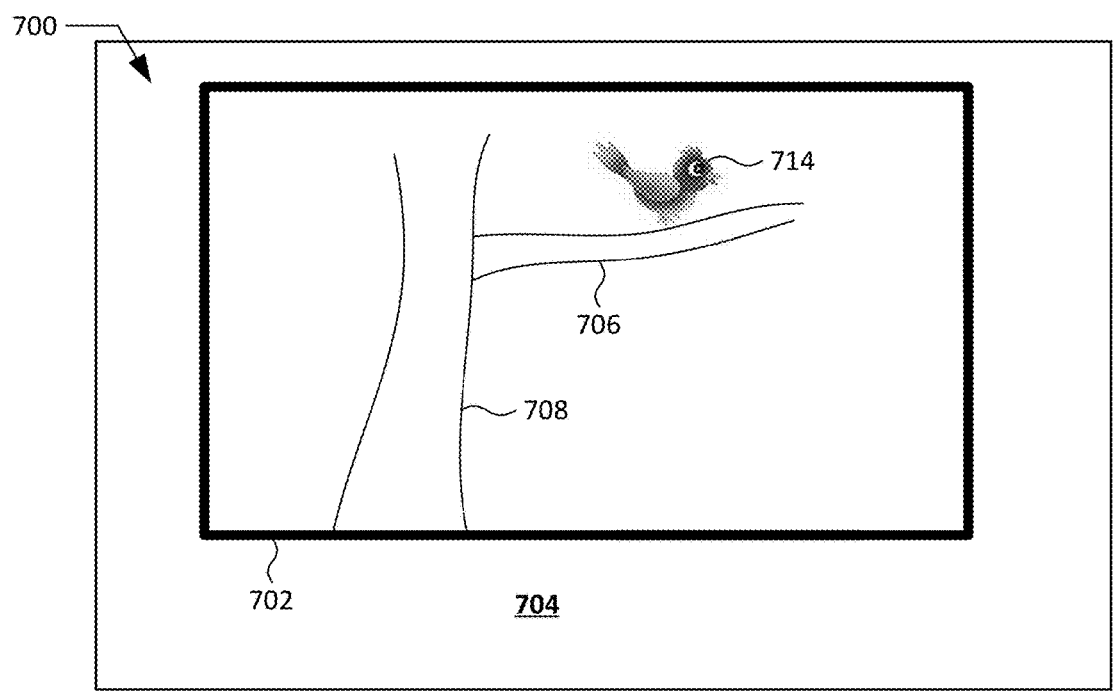

FIGS. 7A and 7B illustrate a fifth example of the AR enhancement apparatus 200 of FIG. 2 projecting an AR enhancement to a real object located within a real environment in response to an occurrence of a user gesture detected in the real environment. As shown in FIG. 7A, an example real environment 700 includes an example real object 702 (e.g., a whiteboard) located and/or positioned (e.g., mounted) on an example wall 704 of the real environment 700. As further shown in FIG. 7A, an example user gesture 706 (corresponding to an aspect or segment of an example physical drawing 708) made by an example marking device 710 held by an example hand 712 of a human (e.g., a user) has been made on the real object 702.

In connection with the illustrated example of FIGS. 7A and 7B, the map generator 204 of FIG. 2 generates a map of the real environment 700, the object detector 206 of FIG. 2 detects the real object 702, and the object identifier 208 of FIG. 2 semantically identifies the real object 702 as a whiteboard. The gesture detector 210 of FIG. 2 detects the user gesture 706, the gesture identifier 212 of FIG. 2 semantically identifies the user gesture 706 as a segment of a physical drawing indicative of a tree branch added to a tree, and the target object determiner 214 of FIG. 2 determines that the real object 702 is the target real object. The enhancement determiner 216 of FIG. 2 has determined an example AR enhancement 714, and has commanded a projector to project the AR enhancement 714. As shown in FIG. 7B, the AR enhancement 714 is projected on the real object 702 of the real environment 700 as an enhancement and/or extension to the physical drawing 708 that has been made on the real object 702, with the AR enhancement 714 being projected as a character (e.g., a bird) that intersects the physical drawing 708 that has been made on the real object 702.

While an example manner of implementing the AR enhancement apparatus 200 is illustrated in FIG. 2, one or more of the elements, processes and/or devices illustrated in FIG. 2 may be combined, divided, re-arranged, omitted, eliminated and/or implemented in any other way. Further, the example sensor array 102, the example projector 104, the example depth sensor(s) 122, the example motion sensor(s) 124, the example projection source 128, the example projection controller 130, the example sensor manager 202, the example map generator 204, the example object detector 206, the example object identifier 208, the example gesture detector 210, the example gesture identifier 212, the example target object determiner 214, the example enhancement determiner 216, the example user interface 218, the example memory 220, the example context evaluator 222, the example physics simulator 224, the example input device(s) 226, and the example output device(s) 228 and/or, more generally, the example AR enhancement apparatus 200 of FIG. 2 may be implemented by hardware, software, firmware and/or any combination of hardware, software and/or firmware. Thus, for example, any of the example sensor array 102, the example projector 104, the example depth sensor(s) 122, the example motion sensor(s) 124, the example projection source 128, the example projection controller 130, the example sensor manager 202, the example map generator 204, the example object detector 206, the example object identifier 208, the example gesture detector 210, the example gesture identifier 212, the example target object determiner 214, the example enhancement determiner 216, the example user interface 218, the example memory 220, the example context evaluator 222, the example physics simulator 224, the example input device(s) 226, and the example output device(s) 228 and/or, more generally, the example AR enhancement apparatus 200 of FIG. 2 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor array 102, the example projector 104, the example depth sensor(s) 122, the example motion sensor(s) 124, the example projection source 128, the example projection controller 130, the example sensor manager 202, the example map generator 204, the example object detector 206, the example object identifier 208, the example gesture detector 210, the example gesture identifier 212, the example target object determiner 214, the example enhancement determiner 216, the example user interface 218, the example memory 220, the example context evaluator 222, the example physics simulator 224, the example input device(s) 226, and/or the example output device(s) 228 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensor array 102, the example projector 104, the example depth sensor(s) 122, the example motion sensor(s) 124, the example projection source 128, the example projection controller 130, the example sensor manager 202, the example map generator 204, the example object detector 206, the example object identifier 208, the example gesture detector 210, the example gesture identifier 212, the example target object determiner 214, the example enhancement determiner 216, the example user interface 218, the example memory 220, the example context evaluator 222, the example physics simulator 224, the example input device(s) 226, and the example output device(s) 228 and/or, more generally, the example AR enhancement apparatus 200 of FIG. 2 may include one or more element(s), process(es) and/or device(s) in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 8:
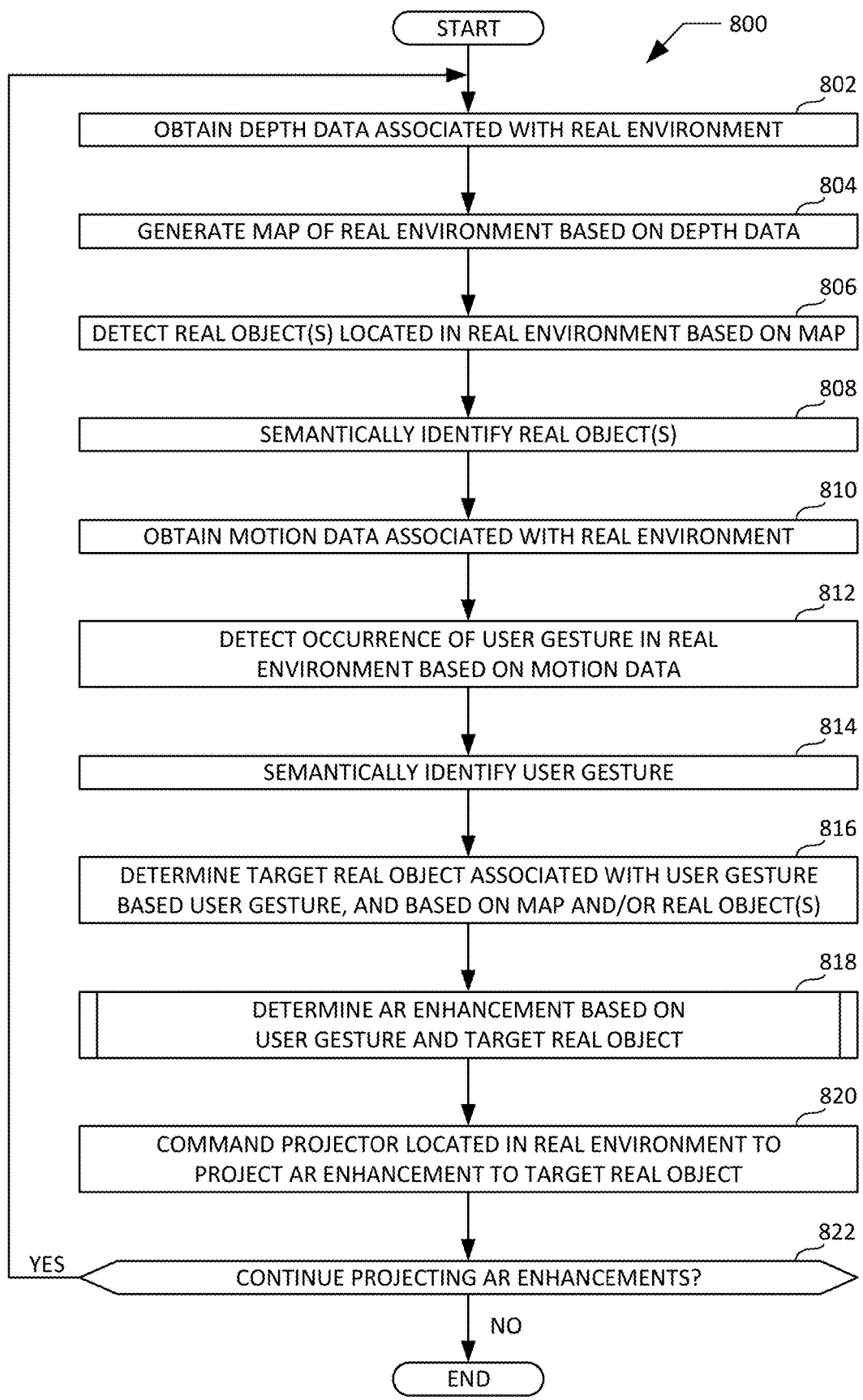
FIG. 8 is a flowchart representative of example machine readable instructions that may be executed to implement the example AR enhancement apparatus of FIG. 2 to project an AR enhancement to a real object located within a real environment in response to an occurrence of a user gesture detected in the real environment.
Figure 9:
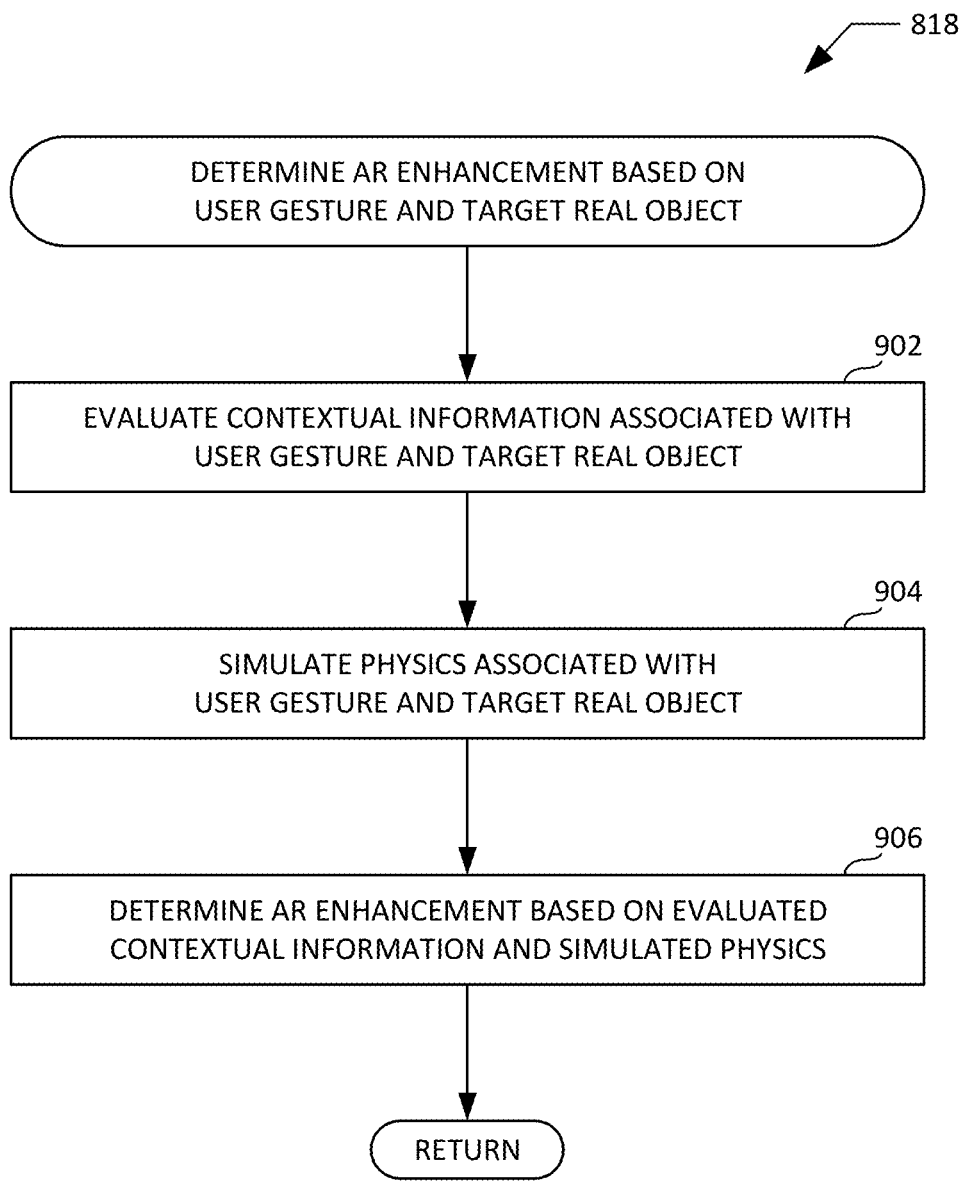
FIG. 9 is a flowchart representative of example machine readable instructions that may be executed to implement the example AR enhancement apparatus of FIG. 2 to determine an AR enhancement based on a user gesture and a target real object.

Flowcharts representative of example hardware logic, machine readable instructions, hardware implemented state machines, and/or any combination thereof for implementing the AR enhancement apparatus 200 of FIG. 2 are shown in FIGS. 8 and 9. The machine readable instructions may be one or more executable program(s) or portion(s) of executable program(s) for execution by a computer processor such as the example processor 1002 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1002, but the entire program(s) and/or parts thereof could alternatively be executed by a device other than the processor 1002 and/or embodied in firmware or dedicated hardware. Further, although the example program(s) is/are described with reference to the flowcharts illustrated in FIGS. 8 and 9, many other methods of implementing the example AR enhancement apparatus 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage device(s) and/or computing device(s) (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 8 is a flowchart representative of example machine readable instructions 800 that may be executed to implement the example AR enhancement apparatus 200 of FIG. 2 to project an AR enhancement to a real object located within a real environment in response to a user gesture detected in the real environment. The example program 800 of FIG. 8 begins when the example sensor manager 202 of FIG. 2 obtains depth data associated with a real environment (block 802). For example, the sensor manager 202 may signal, command and/or instruct the depth sensor(s) 122 of the sensor array 102 of FIGS. 1 and 2 to collect depth data associated with the real environment 100 of FIG. 1 at a specified time, and/or in response to the occurrence of a specified event. In some examples, the sensor manager 202 of FIG. 2 signals, commands and/or instructs the depth sensor(s) 122 of the sensor array 102 of FIGS. 1 and 2 to collect depth data associated with the real environment 100 of FIG. 1 in response to one or more user input(s) received via the user interface 218 of FIG. 2.

At block 804, the example map generator 204 of FIG. 2 generates a map of the real environment based on the depth data. For example, the map generator 204 may generate a map (e.g., a three-dimensional spatial model) of the real environment 100 of FIG. 1 based on depth data obtained from the depth sensor(s) 122 of the sensor array 102 of FIGS. 1 and 2. The map generated by the map generator 204 of FIG. 2 includes a representation of one or more boundary surface(s) of the real environment, and/or one or more real object(s) located and/or positioned within the real environment. For example, the map generated by the map generator 204 of FIG. 2 may include a representation of the floor 108, the ceiling 110, the first wall 112, and/or the second wall 114 of the real environment 100 of FIG. 1, and/or one or more of the first real object 116, the second real object 118, and/or the third real object 120 located and/or positioned within the real environment 100 of FIG. 1. In some examples, the map generated by the map generator 204 of FIG. 2 illustrates, provides and/or identifies relative locations and/or relative positions of respective ones of the boundary surface(s) and/or respective ones of the real object(s) within the real environment 100.

At block 806, the example object detector 206 of FIG. 2 detects one or more real object(s) located in the real environment based on the map. In some examples, the object detector 206 of FIG. 2 detects the one or more real object(s) located in the real environment by applying an object detection algorithm to the map of the real environment generated by the map generator 204 of FIG. 2. For example, the object detector 206 of FIG. 2 may detect one or more of the real object(s) (e.g., the first real object 116, the second real object 118, and/or the third real object 120 of FIG. 1) located in the real environment 100 of FIG. 1 by applying an object detection algorithm to the map of the real environment 100 of FIG. 1 generated by the map generator 204 of FIG. 2. In some examples, the object detection algorithm applied by the object detector 206 of FIG. 2 distinguishes real objects of the real environment represented by the map from boundary surfaces of the real environment represented by the map. For example, the object detection algorithm applied by the object detector 206 of FIG. 2 may distinguish the real objects (e.g., the first real object 116, the second real object 118, and the third real object 120 of FIG. 1) of the real environment 100 of FIG. 1 represented by the map from the boundary surfaces (e.g., the floor 108, the ceiling 110, the first wall 112, and the second wall 114 of FIG. 1) of the real environment 100 of FIG. 1 represented by the map. In such examples, the object detector 206 of FIG. 2 detects the real objects, but does not detect the boundary surfaces. In some examples, the object detection algorithm applied by the object detector 206 of FIG. 2 additionally distinguishes non-human real objects of the real environment represented by the map from human real objects of the real environment represented by the map. For example, the object detection algorithm applied by the object detector 206 of FIG. 2 may distinguish the non-human real objects (e.g., the first real object 116 and the second real object 118 of FIG. 1) of the real environment 100 of FIG. 1 represented by the map from the human real objects (e.g., the third real object 120 of FIG. 1) of the real environment 100 of FIG. 1 represented by the map. In such examples, the object detector 206 of FIG. 2 detects the non-human real objects, but does not detect the human real objects.

At block 808, the example object identifier 208 of FIG. 2 semantically identifies the detected real object(s). In some examples, the object identifier 208 of FIG. 2 semantically identifies (e.g., labels, tags, and/or classifies) respective ones of the real object(s) detected by the object detector 206 of FIG. 2 by applying a semantic identification algorithm to the real object(s) detected by the object detector 206 of FIG. 2 as represented by the map generated by the map generator 204 of FIG. 2. For example, the object identifier 208 of FIG. 2 may apply a semantic identification algorithm to the real object(s) (e.g., the first real object 116, the second real object 118, and/or the third real object 120) detected by the object detector 206 of FIG. 2 as represented by the map of the real environment 100 of FIG. 1 generated by the map generator 204 of FIG. 2. In such an example, the semantic identification algorithm applied by the object identifier 208 of FIG. 2 may semantically identify the first real object 116 of FIG. 1 as a whiteboard, the second real object 118 of FIG. 1 as a framed picture, and/or the third real object 120 of FIG. 1 as a human and/or user. In some examples, the semantic identification algorithm applied by the object identifier 208 of FIG. 2 may further semantically identify one or more physical boundaries and/or physical properties (e.g., a size, a shape, a color, an edge, a contour, a texture, etc.) of respective ones of the real object(s).

At block 810, the example sensor manager 202 of FIG. 2 obtains motion data associated with the real environment. For example, the sensor manager 202 may signal, command and/or instruct the motion sensor(s) 124 of the sensor array 102 of FIGS. 1 and 2 to collect motion data associated with the real environment at a specified time, and/or in response to the occurrence of a specified event. In some examples, the sensor manager 202 of FIG. 2 signals, commands and/or instructs the motion sensor(s) 124 of the sensor array 102 of FIGS. 1 and 2 to collect motion data associated with the real environment in response to one or more user input(s) received via the user interface 218 of FIG. 2.

At block 812, the example gesture detector 210 of FIG. 2 detects an occurrence of a user gesture within the real environment based on the motion data. For example, the gesture detector 210 may detect an occurrence of a user gesture (e.g., a hand, arm, foot or leg gesture made by a human) within the real environment 100 of FIG. 1 based on motion data obtained from the motion sensor(s) 124 of the sensor array 102 of FIGS. 1 and 2. In some examples, the gesture detector 210 of FIG. 2 detects the occurrence of the user gesture within the real environment by applying a movement recognition algorithm to the motion data associated with the real environment. For example, the gesture detector 210 of FIG. 2 may detect the occurrence of the user gesture within the real environment 100 of FIG. 1 by applying an object detection algorithm to the motion data obtained from the motion sensor(s) 124 of the sensor array 102 of FIGS. 1 and 2. In some examples, the movement recognition algorithm applied by the gesture detector 210 of FIG. 2 distinguishes a human movement (e.g., a user gesture) from a non-human movement (e.g., a non-human real object movement). For example, the movement recognition algorithm applied by the gesture detector 210 of FIG. 2 may distinguish a movement of the third real object 120 (e.g., a movement of the hand 134 of the human corresponding to the third real object 120) of FIG. 1 from a movement of the second real object 118 (e.g., a movement of the framed picture corresponding to the second real object 118) of FIG. 1. In such examples, the gesture detector 210 of FIG. 2 detects the human movement, but does not detect the non-human movement.

At block 814, the example gesture identifier 212 of FIG. 2 semantically identifies the detected user gesture. In some examples, the gesture identifier 212 of FIG. 2 semantically identifies (e.g., labels, tags, and/or classifies) the user gesture detected by the gesture detector 210 of FIG. 2 by applying a semantic identification algorithm to the user gesture. For example, the gesture identifier 212 of FIG. 2 may apply a semantic identification algorithm to the user gesture detected by the gesture detector 210 of FIG. 2 as occurring within the real environment 100 of FIG. 1. In such an example, the semantic identification algorithm applied by the gesture identifier 212 of FIG. 2 may semantically identify the user gesture as one of a touch input, a virtual drawing, or a physical drawing. In some examples, the semantic identification algorithm applied by the gesture identifier 212 of FIG. 2 may further semantically identify one or more physical boundaries and/or physical properties (e.g., a size, a shape, an edge, a contour, etc.) of the user gesture.

At block 816, the example target object determiner 214 of FIG. 2 determines a target real object associated with the user gesture based on the map and/or the detected real object(s). For example, the target object determiner 214 of FIG. 2 may determine a target real object associated with the user gesture detected by the gesture detector 210 of FIG. 2 based on the user gesture, and further based on the map of the real environment 100 of FIG. 1 generated by the map generator 204 of FIG. 2 and/or the real object(s) detected by the object detector 206 of FIG. 2. In some examples, the target object determiner 214 of FIG. 2 determines a target real object associated with the user gesture from among the real object(s) represented by the map generated by the map generator 204 of FIG. 2 and/or detected by the object detector 206 of FIG. 2 by identifying the target real object as the one of the real object(s) (e.g., the one of the non-human real object(s)) that is most proximate relative to the user gesture. For example, the target object determiner 214 of FIG. 2 may determine, based on the user gesture, and further based on the map of the real environment 100 of FIG. 1 generated by the map generator 204 of FIG. 2 and/or the real object(s) detected by the object detector 206 of FIG. 2, that the user gesture occurring within the real environment 100 of FIG. 1 is more proximate to the second real object 118 (e.g., the framed picture) of FIG. 1 than to the first real object 116 (e.g., the whiteboard) of FIG. 1. In such an example, the target object determiner 214 of FIG. 2 identifies the second real object 118 as the target real object associated with the user gesture.

At block 818, the example enhancement determiner 216 of FIG. 2 determines an AR enhancement based on the user gesture and the target real object. For example, the enhancement determiner 216 of FIG. 2 may determine an AR enhancement based on the user gesture detected by the gesture detector 210 of FIG. 2 and the target real objects determined by the target object determiner 214 of FIG. 2. In some examples, the enhancement determiner 216 of FIG. 2 determines the AR enhancement by implementing, invoking and/or applying an AR enhancement model structured as a set of semantic rules that are configured to guide interactions and/or relationships between the AR enhancement associated with the user gesture on the one hand, and the target real object associated with the user gesture on the other hand. In such examples, the user gesture and the target real object are inputs to the AR enhancement model. In some such examples, the AR enhancement model further incorporates the map generated by the map generator 204 of FIG. 2, the real object(s) detected by the object detector 206 of FIG. 2, the semantic identification(s) of the real object(s) generated (e.g., semantically identified) by the object identifier 208 of FIG. 2, and/or the semantic identification(s) of the user gesture(s) generated (e.g., semantically identified) by the gesture identifier 212 of FIG. 2 as inputs to the AR enhancement model. The AR enhancement model implemented, invoked and/or applied by the enhancement determiner 216 of FIG. 2 determines and/or outputs an AR enhancement that is based on the specific content of the inputs described above. In some examples, the AR enhancement determined by the enhancement determiner 216 of FIG. 2 includes at least one of a virtual resizing of a target real object, a virtual structure associated with (e.g., intersecting) a target real object, or a virtual character associated with (e.g., intersecting) a target real object. An example process that may be used to implement block 818 of the example program 800 of FIG. 8 is described in greater detail below in connection with FIG. 9.

At block 820, the example enhancement determiner 216 of FIG. 2 commands a projector located within the real the real environment to project the AR enhancement to the target real object. For example, the enhancement determiner 216 of FIG. 2 may command, instruct, and/or signal the projection source 128, the projection controller 130 and/or, more generally, the projector 104 of FIGS. 1 and 2 located within the real environment 100 of FIG. 1 in a manner that causes the projection source 128, the projection controller 130 and/or, more generally, the projector 104 of FIGS. 1 and 2 to project the AR enhancement, as determined by the enhancement determiner 216 of FIG. 2, to the target real object located within the real environment 100 of FIG. 1.

At block 822, the example AR enhancement apparatus 200 of FIG. 2 determines whether to continue projecting AR enhancements. For example, the AR enhancement apparatus 200 may receive one or more user input(s) via the user interface 218 of FIG. 2 indicating that AR enhancements are not to continue being projected. If the AR enhancement apparatus 200 of FIG. 2 determines at block 822 that AR enhancements are to continue being projected, control of the example program 800 of FIG. 8 returns to block 802. If the AR enhancement apparatus 200 of FIG. 2 instead determines at block 822 that AR enhancements are not to continue being projected, the example program 800 of FIG. 8 ends.

FIG. 9 is a flowchart representative of example machine readable instructions 818 that may be executed to implement the example AR enhancement apparatus 200 of FIG. 2 to determine an AR enhancement based on a user gesture, a target real object, and/or a map of a real environment. Example operations of blocks 902, 904 and 906 of FIG. 9 may be used to implement block 818 of FIG. 8. The example program 818 of FIG. 9 begins when the example context evaluator 222 of FIG. 2 evaluates contextual information associated with the user gesture and the target real object. For example, the context evaluator 222 of FIG. 2 may evaluate contextual information associated with the user gesture detected by the gesture detector 210 of FIG. 2, as well as contextual information associated with the target real object determined by the target object determiner 214 of FIG. 2. In some examples, the contextual information evaluated by the context evaluator 222 of FIG. 2 includes one or more portion(s) (including all) of the semantic identification(s) of the real object(s) generated (e.g., semantically identified) by the object identifier 208 of FIG. 2, and/or one or more portion(s) (including all) of the semantic identification(s) of the user gesture generated (e.g., semantically identified) by the gesture identifier 212 of FIG. 2. For example, the context evaluator 222 of FIG. 2 may evaluate one or more physical boundaries and/or physical properties (e.g., a size, a shape, a color, an edge, a contour, a texture, etc.) of the user gesture and/or of the target real object. The context evaluator 222 of FIG. 2 may additionally or alternatively evaluate one or more physical boundaries and/or physical properties associated with the map generated by the map generator 204 of FIG. 2.

The contextual evaluation performed by the of context evaluator 222 of FIG. 2 evaluates possible and/or probable contextual interactions and/or relationships between the user gesture, the target real object, and/or one or more potential (e.g., candidate) AR enhancement(s), and guides the enhancement determiner 216 of FIG. 2 in identifying, selecting and/or determining a specific one of the potential (e.g., candidate) AR enhancement(s). For example, the enhancement determiner 216 of FIG. 2 may identify, select and/or determine a specific AR enhancement (e.g., an AR enhancement having a specific type, size, shape, color, orientation and/or location) to be projected by a projector located in a real environment based on the specific outcome(s), output(s) and/or result(s) of the contextual evaluation performed by the context evaluator 222 of FIG. 2

At block 904, the example physics simulator 224 of FIG. 2 simulates physics associated with the user gesture and the target real object. For example, the physics simulator 224 of FIG. 2 may simulate physics associated with the user gesture detected by the gesture detector 210 of FIG. 2, as well as physics associated with the target real object determined by the target object determiner 214 of FIG. 2. In some examples, the physics simulated by the physics simulator 224 of FIG. 2 may be based on one or more portion(s) (including all) of the semantic identification(s) of the real object(s) generated (e.g., semantically identified) by the object identifier 208 of FIG. 2, and/or one or more portion(s) (including all) of the semantic identification(s) of the user gesture generated (e.g., semantically identified) by the gesture identifier 212 of FIG. 2. For example, the physics simulator 224 of FIG. 2 may evaluate one or more physical boundaries and/or physical properties (e.g., a size, a shape, an edge, a contour, a texture, an orientation, a location, etc.) of the user gesture and/or of the target real object. The physics simulator 224 of FIG. 2 may additionally or alternatively evaluate one or more physical boundaries and/or physical properties associated with the map generated by the map generator 204 of FIG. 2.

The physics simulation performed by the of physics simulator 224 of FIG. 2 simulates possible and/or probable physical interactions and/or relationships between the user gesture, the target real object, and/or one or more potential (e.g., candidate) AR enhancement(s), and guides the enhancement determiner 216 of FIG. 2 in identifying, selecting and/or determining a specific one of the potential (e.g., candidate) AR enhancement(s). For example, the enhancement determiner 216 of FIG. 2 may identify, select and/or determine a specific AR enhancement (e.g., an AR enhancement having a specific type, size, shape, orientation and/or location) to be projected by a projector located in a real environment based on the specific outcome(s), output(s) and/or result(s) of the physics simulation performed by the physics simulator 224 of FIG. 2.

At block 906, the example enhancement determiner 216 of FIG. 2 determines an AR enhancement based on the evaluated contextual information and the simulated physics. For example, the enhancement determiner 216 of FIG. 2 may identify, select and/or determine a specific AR enhancement (e.g., an AR enhancement having a specific type, size, shape, orientation and/or location) from among one or more potential (e.g., candidate) AR enhancement(s) based on the specific outcome(s), output(s) and/or result(s) of the contextual evaluation performed by the context evaluator 222 of FIG. 2, and based on the specific outcome(s), output(s) and/or result(s) of the physics simulation performed by the physics simulator 224 of FIG. 2. Following block 906, control of the example program 818 of FIG. 9 returns to a function call such as block 818 of the example program 800 of FIG. 8.

Figure 10:
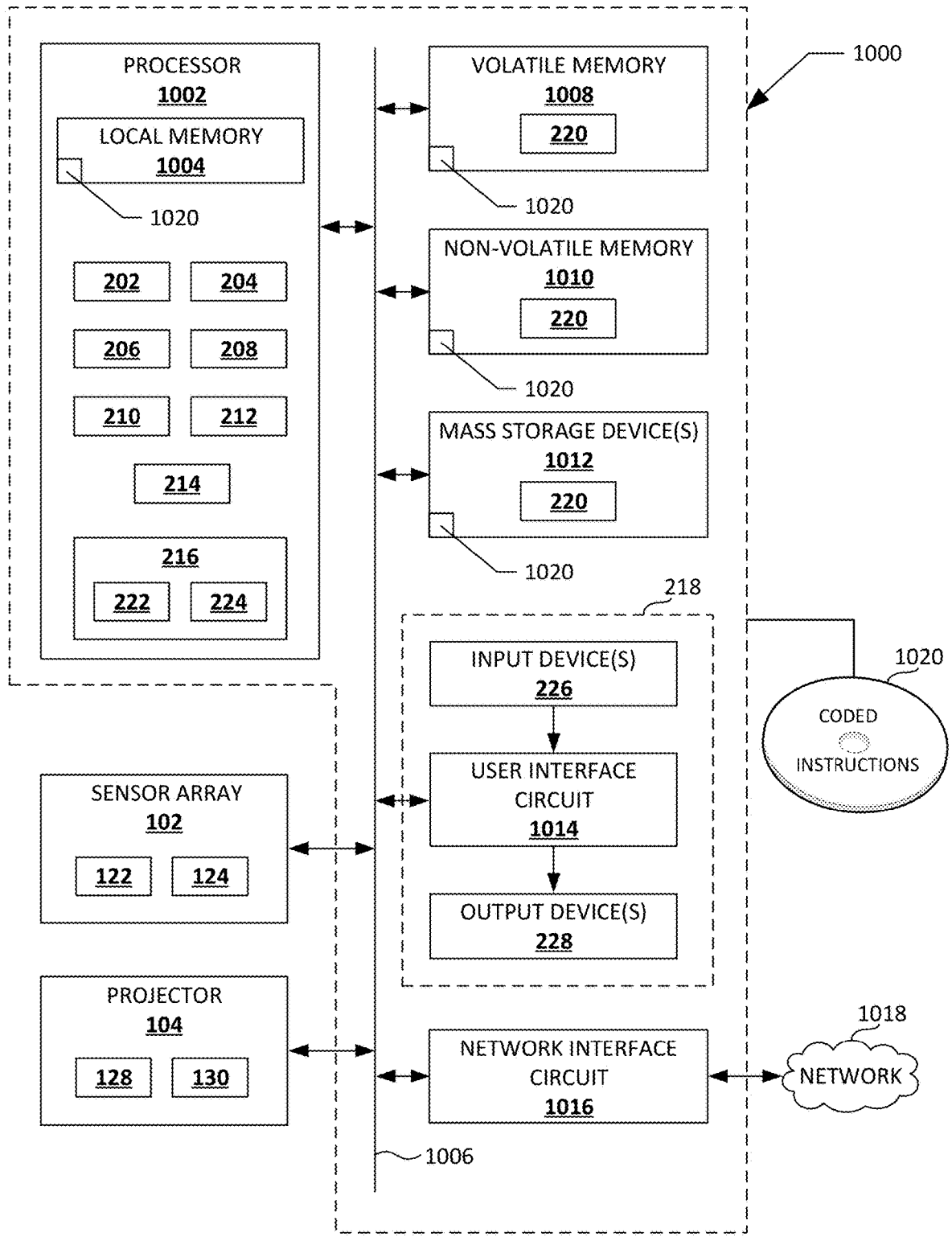
FIG. 10 is a block diagram of an example processor platform structured to execute the example machine readable instructions of FIGS. 8 and 9 to implement the example AR enhancement apparatus of FIG. 2.

FIG. 10 is a block diagram of an example processor platform 1000 structured to execute the example machine readable instructions 800 of FIGS. 8 and 9 to implement the example AR enhancement apparatus 200 of FIG. 2. The processor platform 1000 of the illustrated example includes a processor 1002. The processor 1002 of the illustrated example is hardware. For example, the processor 1002 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 1002 implements the example sensor manager 202, the example map generator 204, the example object detector 206, the example object identifier 208, the example gesture detector 210, the example gesture identifier 212, the example target object determiner 214, the example enhancement determiner 216, the example context evaluator 222, and the example physics simulator 224 of FIG. 2.

The processor 1002 of the illustrated example includes a local memory 1004 (e.g., a cache). The processor 1002 is in communication with the example sensor array 102 (including the example depth sensor(s) 122 and the example motion sensor(s) 124) and the example projector 104 (including the example projection source 128 and the example projection controller 130) of FIGS. 1 and 2 via a bus 1006. The processor 1002 is also in communication with a main memory including a volatile memory 1008 and a non-volatile memory 1010 via the bus 1006. The volatile memory 1008 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1010 may be implemented by flash memory and/or any other desired type of memory device. Access to the main memory 1008, 1010 is controlled by a memory controller.

The processor platform 1000 of the illustrated example also includes one or more mass storage device(s) 1012 for storing software and/or data. Examples of such mass storage device(s) 1012 include floppy disk drives, hard drive disks, compact disk drives, Blu-ray disk drives, redundant array of independent disks (RAID) systems, and digital versatile disk (DVD) drives. In the illustrated example of FIG. 10, one or more of the volatile memory 1008, the non-volatile memory 1010, and/or the mass storage device(s) 1012 implement(s) the example memory 220 of FIG. 2.

The processor platform 1000 of the illustrated example also includes a user interface circuit 1014. The user interface circuit 1014 may be implemented by any type of interface standard, such as an Ethernet interface, a universal serial bus (USB), a Bluetooth® interface, a near field communication (NFC) interface, and/or a PCI express interface. In the illustrated example, one or more input device(s) 226 of FIG. 2 are connected to the user interface circuit 1014. The input device(s) 226 permit(s) a user to enter data and/or commands into the processor 1002. The input device(s) 226 can be implemented by, for example, an audio sensor, a microphone, a camera (still or video), a keyboard, a button, a mouse, a touchscreen, a track-pad, a trackball, isopoint and/or a voice recognition system. One or more output device(s) 228 of FIG. 2 are also connected to the user interface circuit 1014 of the illustrated example. The output device(s) 228 can be implemented, for example, by a display device (e.g., a light emitting diode (LED), an organic light emitting diode (OLED), a liquid crystal display (LCD), a touchscreen, etc.), a tactile output device, a speaker, and/or one or more AR output device(s) (e.g., an AR headset, AR glasses, etc.). The user interface circuit 1014 of the illustrated example, thus, typically includes a graphics driver card, a graphics driver chip and/or a graphics driver processor. In the illustrated example, the input device(s) 226, the output device(s) 228, and the user interface circuit 1014 collectively implement the example user interface 218 of FIG. 2.

The processor platform 1000 of the illustrated example also includes a network interface circuit 1016. The network interface circuit 1016 may be implemented by any type of interface standard, such as an Ethernet interface, a universal serial bus (USB), a Bluetooth® interface, a near field communication (NFC) interface, and/or a PCI express interface. The network interface circuit 1016 may include a radio transmitter, a radio receiver, and/or a radio transceiver to facilitate the exchange of data and/or signals with external machines (e.g., a server, a computing device, etc.) via a network 1018 (e.g., a cellular network, a wireless local area network (WLAN), etc.).

Coded instructions 1020 including the machine readable instructions 800 of FIGS. 8 and 9 may be stored in the local memory 1004, in the volatile memory 1008, in the non-volatile memory 1010, on the mass storage device(s) 1012, and/or on a removable non-transitory computer readable storage medium such as a flash memory stick, a CD, or a DVD.

From the foregoing, it will be appreciated that methods and apparatus have been disclosed that advantageously improve the intersection between the physical space and the virtual space by projecting AR enhancements (e.g., AR extensions and/or object-intersecting AR content) to real objects located within a real environment in response to user gestures detected in the real environment. Examples disclosed herein generate a map of a real environment based on depth data obtained from a sensor array located within the real environment. Based on the map, examples disclosed herein detect one or more real object(s) located within the real environment. Examples disclosed herein detect an occurrence of a user gesture within the real environment based on motion data obtained from the sensor array. Based on the user gesture and further based on the map and/or the detected real object(s), examples disclosed herein determine a target real object (e.g., one of the detected real object(s)) associated with the user gesture. Examples disclosed herein determine an AR enhancement based on the user gesture and/or the target real object. In some disclosed examples, the AR enhancement is determined based on an evaluation of contextual information associated with the user gesture and/or the target real object. In some disclosed examples, the AR enhancement is determined based on a simulation of physics associated with the user gesture and/or the target real object. Examples disclosed herein instruct a projector located in the real environment to project the AR enhancement to the target real object.

In some examples, an apparatus is disclosed. In some disclosed examples, the apparatus includes an object detector, a gesture detector, and an enhancement determiner. In some disclosed examples, the object detector is to detect one or more real objects located in a real environment based on depth data obtained from a sensor array located within the real environment. In some disclosed examples, the gesture detector is to detect a user gesture within the real environment based on motion data obtained from the sensor array. In some disclosed examples, the user gesture is associated with a target real object from among the one or more real objects. In some disclosed examples, the enhancement determiner is to determine an AR enhancement based on the user gesture and the target real object. In some disclosed examples, the enhancement determiner is to instruct a projector to project the AR enhancement to the target real object.

In some disclosed examples, the apparatus includes a map generator to generate a map of the real environment based on the depth data. In some disclosed examples, the object detector is to detect the one or more real objects located in the real environment based on the map.

In some disclosed examples, the apparatus includes a target object determiner to determine the target real object associated with the user gesture based on the user gesture and further based on at least one of the map or the one or more real objects.

In some disclosed examples, the apparatus includes an object identifier to semantically identify the one or more real objects.

In some disclosed examples, the apparatus includes a gesture identifier to semantically identify the user gesture.

In some disclosed examples, the apparatus includes a context evaluator to evaluate contextual information associated with at least one of the user gesture or the target real object. In some disclosed examples, the enhancement determiner is to determine the AR enhancement based on the evaluated contextual information.

In some disclosed examples, the apparatus includes a physics simulator to simulate physics associated with at least one of the user gesture or the target real object. In some disclosed examples, the enhancement determiner is to determine the AR enhancement based on the simulated physics.

In some disclosed examples of the apparatus, the user gesture includes at least one of a touch input associated with the target real object, a virtual drawing associated with the target real object, or a physical drawing associated with the target real object.

In some disclosed examples of the apparatus, the AR enhancement includes at least one of a virtual resizing of the target real object, or a virtual structure intersecting the target real object.

In some disclosed examples of the apparatus, the AR enhancement includes a virtual character interacting with the target real object.

In some examples, a non-transitory computer-readable storage medium is disclosed. In some disclosed examples, the non-transitory computer-readable medium includes instructions that, when executed, cause one or more processors of a machine to detect one or more real objects located in a real environment based on depth data obtained from a sensor array located within the real environment. In some disclosed examples, the instructions, when executed, cause the one or more processors to detect a user gesture within the real environment based on motion data obtained from the sensor array. In some disclosed examples, the user gesture is associated with a target real object from among the one or more real objects. In some disclosed examples, the instructions, when executed, cause the one or more processors to determine an AR enhancement based on the user gesture and the target real object. In some disclosed examples, the instructions, when executed, cause the one or more processors to instruct a projector to project the AR enhancement to the target real object.

In some disclosed examples, the instructions, when executed, cause the one or more processors to generate a map of the real environment based on the depth data. In some disclosed examples, the detecting of the one or more real objects located in the real environment is based on the map.

In some disclosed examples, the instructions, when executed, cause the one or more processors to determine the target real object associated with the user gesture based on the user gesture and further based on at least one of the map or the one or more real objects.

In some disclosed examples, the instructions, when executed, cause the one or more processors to semantically identify the one or more real objects.

In some disclosed examples, the instructions, when executed, cause the one or more processors to semantically identify the user gesture.

In some disclosed examples, the instructions, when executed, cause the one or more processors to evaluate contextual information associated with at least one of the user gesture or the target real object. In some disclosed examples, the instructions, when executed, cause the one or more processors to determine the AR enhancement based on the evaluated contextual information.

In some disclosed examples, the instructions, when executed, cause the one or more processors to simulate physics associated with at least one of the user gesture or the target real object. In some disclosed examples, the instructions, when executed, cause the one or more processors to determine the AR enhancement based on the simulated physics.

In some disclosed examples of the non-transitory computer-readable storage medium, the user gesture includes at least one of a touch input associated with the target real object, a virtual drawing associated with the target real object, or a physical drawing associated with the target real object.

In some disclosed examples of the non-transitory computer-readable storage medium, the AR enhancement includes at least one of a virtual resizing of the target real object, or a virtual structure intersecting the target real object.

In some disclosed examples of the non-transitory computer-readable storage medium, the AR enhancement includes a virtual character interacting with the target real object.

In some examples, a method is disclosed. In some disclosed examples, the method includes detecting, by executing computer-readable instructions with one or more processors, one or more real objects located in a real environment based on depth data obtained from a sensor array located within the real environment. In some disclosed examples, the method includes detecting, by executing the computer-readable instructions with the one or more processors, a user gesture within the real environment based on motion data obtained from the sensor array. In some disclosed examples, the user gesture is associated with a target real object from among the one or more real objects. In some disclosed examples, the method includes determining, by executing the computer-readable instructions with the one or more processors, an AR enhancement based on the user gesture and the target real object. In some disclosed examples, the method includes instructing, by executing the computer-readable instructions with the one or more processors, a projector to project the AR enhancement to the target real object.

In some disclosed examples, the method includes generating, by executing the computer-readable instructions with the one or more processors, a map of the real environment based on the depth data. In some disclosed examples, the detecting of the one or more real objects located in the real environment is based on the map.

In some disclosed examples, the method includes determining, by executing the computer-readable instructions with the one or more processors, the target real object associated with the user gesture based on the user gesture and further based on at least one of the map or the one or more real objects.

In some disclosed examples, the method includes semantically identifying, by executing the computer-readable instructions with the one or more processors, the one or more real objects.

In some disclosed examples, the method includes semantically identifying, by executing the computer-readable instructions with the one or more processors, the user gesture.

In some disclosed examples, the method includes evaluating, by executing the computer-readable instructions with the one or more processors, contextual information associated with at least one of the user gesture or the target real object. In some disclosed examples, the method includes determining, by executing the computer-readable instructions with the one or more processors, the AR enhancement based on the evaluated contextual information.

In some disclosed examples, the method includes simulating, by executing the computer-readable instructions with the one or more processors, physics associated with at least one of the user gesture or the target real object. In some disclosed examples, the method includes determining, by executing the computer-readable instructions with the one or more processors, the AR enhancement based on the simulated physics.

In some disclosed examples of the method, the user gesture includes at least one of a touch input associated with the target real object, a virtual drawing associated with the target real object, or a physical drawing associated with the target real object.

In some disclosed examples of the method, the AR enhancement includes at least one of a virtual resizing of the target real object, or a virtual structure intersecting the target real object.

In some disclosed examples of the method, the AR enhancement includes a virtual character interacting with the target real object.

In some examples, an apparatus is disclosed. In some disclosed examples, the apparatus includes means for detecting one or more real objects located in a real environment based on depth data obtained from a sensor array located within the real environment. In some disclosed examples, the apparatus includes means for detecting a user gesture within the real environment based on motion data obtained from the sensor array. In some disclosed examples, the user gesture is associated with a target real object from among the one or more real objects. In some disclosed examples, the apparatus includes means for determining an AR enhancement based on the user gesture and the target real object. In some disclosed examples, the apparatus includes means for instructing a projector to project the AR enhancement to the target real object.

In some disclosed examples, the apparatus includes means for generating a map of the real environment based on the depth data. In some disclosed examples, the means for detecting the one or more real objects is to detect the one or more real objects located in the real environment based on the map.

In some disclosed examples, the apparatus includes means for determining the target real object associated with the user gesture based on the user gesture and further based on at least one of the map or the one or more real objects.

In some disclosed examples, the apparatus includes means for semantically identifying the one or more real objects.

In some disclosed examples, the apparatus includes means for semantically identifying the user gesture.

In some disclosed examples, the apparatus includes means for evaluating contextual information associated with at least one of the user gesture or the target real object. In some disclosed examples, the means for determining the AR enhancement is to determine the AR enhancement based on the evaluated contextual information.

In some disclosed examples, the apparatus includes means for simulating physics associated with at least one of the user gesture or the target real object. In some disclosed examples, the means for determining the AR enhancement is to determine the AR enhancement based on the simulated physics.

In some disclosed examples of the apparatus, the user gesture includes at least one of a touch input associated with the target real object, a virtual drawing associated with the target real object, or a physical drawing associated with the target real object.

In some disclosed examples of the apparatus, the AR enhancement includes at least one of a virtual resizing of the target real object, or a virtual structure intersecting the target real object.

In some disclosed examples of the apparatus, the AR enhancement includes a virtual character interacting with the target real object.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   memory;
   computer readable instructions; and
   processor circuitry to execute the computer-readable instructions to:
   identify a user gesture within a real environment based on data obtained from a motion sensor, the user gesture associated with a target real object from among one or more real objects located within the real environment, the user gesture representing a desired shape of a desired virtual drawing to be projected to the target real object;
   determine an augmented reality (AR) enhancement based on the user gesture and the target real object, the AR enhancement including a virtual drawing having a shape corresponding to the desired shape of the desired virtual drawing, the AR enhancement further including a virtual character to interact with the virtual drawing, the virtual character to be selected from a plurality of candidate virtual characters, the selection to be based on simulated physics associated with the virtual drawing in relation to the target real object; and
   instruct a projector to project the AR enhancement to the target real object.

2. The apparatus as defined in claim 1, wherein the processor circuitry is to execute the computer-readable instructions to instruct a projection controller of the projector to adjust a position of a projection source of the projector relative to the target real object to project the AR enhancement to the target real object.

3. The apparatus as defined in claim 1, wherein the processor circuitry is to execute the computer-readable instructions to:
   evaluate contextual information associated with at least one of the user gesture or the target real object; and determine the AR enhancement based on the evaluated contextual information.

4. The apparatus as defined in claim 1, wherein the processor circuitry is to execute the computer-readable instructions to semantically identify the one or more real objects.

5. The apparatus as defined in claim 1, wherein the processor circuitry is to execute the computer-readable instructions to identify the one or more real objects based on depth data obtained from a depth sensor.

6. The apparatus as defined in claim 5, wherein the depth sensor is at least one of a radio detection and ranging (RADAR) sensor, a light detection and ranging (LIDAR) sensor, or a time-of-flight (TOF) sensor.

7. The apparatus as defined in claim 5, wherein the processor circuitry is to execute the computer-readable instructions to:
generate a map of the real environment based on the data obtained from the depth sensor; and
detect the one or more real objects located in the real environment based on the map.

8. The apparatus as defined in claim 7, wherein the processor circuitry is to execute the computer-readable instructions to determine the target real object associated with the user gesture based on the user gesture and further based on at least one of the map or the one or more real objects.

9. The apparatus as defined in claim 1, wherein the virtual character is to interact with the virtual drawing based on simulated physics associated with the virtual character in relation to the virtual drawing.

10. The apparatus as defined in claim 9, wherein the virtual character is to interact with the virtual drawing further based on the simulated physics associated with the virtual drawing in relation to the target real object.

11. A non-transitory computer-readable storage medium comprising instructions that, when executed, cause one or more processors of a machine to at least:
identify a user gesture within a real environment based on data obtained from a motion sensor, the user gesture associated with a target real object from among one or more real objects located within the real environment, the user gesture representing a desired shape of a desired virtual drawing to be projected to the target real object;
determine an augmented reality (AR) enhancement based on the user gesture and the target real object, the AR enhancement including a virtual drawing having a shape corresponding to the desired shape of the desired virtual drawing, the AR enhancement further including a virtual character to interact with the virtual drawing, the virtual character to be selected from a plurality of candidate virtual characters, the selection to be based on simulated physics associated with the virtual drawing in relation to the target real object; and
instruct a projector to project the AR enhancement to the target real object.

12. The non-transitory computer-readable storage medium as defined in claim 11, wherein the instructions, when executed, cause the one or more processors to instruct a projection controller of the projector to adjust a position of a projection source of the projector relative to the target real object to project the AR enhancement to the target real object.

13. The non-transitory computer-readable storage medium as defined in claim 11, wherein the instructions, when executed, cause the one or more processors to:
evaluate contextual information associated with at least one of the user gesture or the target real object; and
determine the AR enhancement based on the evaluated contextual information.

14. The non-transitory computer-readable storage medium as defined in claim 11, wherein the virtual character is to interact with the virtual drawing based on simulated physics associated with the virtual character in relation to the virtual drawing.

15. The non-transitory computer-readable storage medium as defined in claim 14, wherein the virtual character is to interact with the virtual drawing further based on the simulated physics associated with the virtual drawing in relation to the target real object.

16. An apparatus, comprising:
a gesture detector to detect a user gesture within a real environment based on motion data obtained from a motion sensor, the user gesture associated with a target real object from among one or more real objects located within the environment, the user gesture representing a desired shape of a desired virtual drawing to be projected to the target real object; and
an enhancement determiner to:
determine an augmented reality (AR) enhancement based on the user gesture and the target real object, the AR enhancement including a virtual drawing having a shape corresponding to the desired shape of the desired virtual drawing, the AR enhancement further including a virtual character to interact with the virtual drawing, the virtual character to be selected from a plurality of candidate virtual characters, the selection to be based on simulated physics associated with the virtual drawing in relation to the target real object; and
instruct a projector to project the AR enhancement to the target real object.

17. The apparatus as defined in claim 16, wherein the enhancement determiner is to instruct a projection controller of the projector to adjust a position of a projection source of the projector relative to the target real object to project the AR enhancement to the target real object.

18. The apparatus as defined in claim 16, further including a context evaluator to evaluate contextual information associated with at least one of the user gesture or the target real object, the enhancement determiner to determine the AR enhancement based on the evaluated contextual information.

19. The apparatus as defined in claim 16, wherein the virtual character is to interact with the virtual drawing based on simulated physics associated with the virtual character in relation to the virtual drawing.

20. The apparatus as defined in claim 19, wherein the virtual character is to interact with the virtual drawing further based on the simulated physics associated with the virtual drawing in relation to the target real object.

* * * * *